(12) United States Patent
Sekiguchi et al.

(10) Patent No.: US 11,016,240 B2
(45) Date of Patent: May 25, 2021

(54) LIGHT GUIDE FILM AND BACKLIGHT UNIT

(71) Applicant: FUJIFILM Corporation, Tokyo (JP)

(72) Inventors: Megumi Sekiguchi, Kanagawa (JP); Naoyoshi Yamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/544,303

(22) Filed: Aug. 19, 2019

(65) Prior Publication Data

US 2019/0383992 A1    Dec. 19, 2019

Related U.S. Application Data

(63) Continuation of application No. PCT/JP2018/006175, filed on Feb. 21, 2018.

(30) Foreign Application Priority Data

Feb. 22, 2017 (JP) .............................. JP2017-030816
Sep. 27, 2017 (JP) .............................. JP2017-185872

(51) Int. Cl.
    *F21V 8/00*    (2006.01)

(52) U.S. Cl.
    CPC ......... *G02B 6/0078* (2013.01); *G02B 6/0043* (2013.01)

(58) Field of Classification Search
    CPC .............................. G02B 6/0078; G02B 6/0043
    (Continued)

(56) References Cited

U.S. PATENT DOCUMENTS

2011/0013421 A1    1/2011  Um
2011/0157870 A1    6/2011  Liu et al.
(Continued)

FOREIGN PATENT DOCUMENTS

| JP | 2011-023353 A | 2/2011 |
| JP | 2011-138756 A | 7/2011 |
| WO | 2011/058960 A1 | 5/2011 |

OTHER PUBLICATIONS

Office Action, issued by the Japanese Patent Office dated Apr. 14, 2020, in connection with Japanese Patent Application No. 2019-501369.

(Continued)

*Primary Examiner* — Rajarshi Chakraborty
*Assistant Examiner* — Hana S Featherly
(74) *Attorney, Agent, or Firm* — Edwards Neils LLC; Jean C. Edwards, Esq.

(57) ABSTRACT

A light guide film that is bendable, has a strong resistance to impact, and can perform the adjustment of the brightness per region, and a backlight unit. The light guide film includes a plurality of optical units each of which includes a light guide portion and an emission portion; and a resin portion that is filled between the optical units adjacent to each other, in which the light guide portion guides light incident from a light source to the emission portion, the emission portion emits light guided and incident from the light guide portion from a light emission surface, the plurality of optical units are arranged in a plane direction of the light emission surfaces such that the light emission surfaces of the emission portions are parallel to each other, and the light guide portions and the emission portions are arranged in the plane direction of the light emission surfaces.

10 Claims, 15 Drawing Sheets

(58) Field of Classification Search
USPC .................................................. 362/613, 600
See application file for complete search history.

(56) References Cited

U.S. PATENT DOCUMENTS

2012/0170314 A1* 7/2012 Chang .................. G02B 6/0068
362/613
2012/0224106 A1   9/2012 Kosaka et al.

OTHER PUBLICATIONS

International Search Report issued in PCT/JP2018/006175 dated Apr. 17, 2018.
Written Opinion issued in PCT/JP2018/006175 dated Apr. 17, 2018.
International Preliminary Report on Patentability completed by WIPO on Aug. 27, 2019 in connection with International Patent Application No. PCT/JP2018/006175.

* cited by examiner

LIGHT GUIDE FILM AND BACKLIGHT UNIT

CROSS-REFERENCE TO RELATED APPLICATIONS

This application is a Continuation of PCT International Application No. PCT/JP2018/006175 filed on Feb. 21, 2018, which was published under PCT Article 21(2) in Japanese, and which claims priority under 35 U.S.C. § 119(a) to Japanese Patent Application No. 2017-030816, filed on Feb. 22, 2017 and Japanese Patent Application No. 2017-185872, filed on Sep. 27, 2017. The above applications are hereby expressly incorporated by reference, in their entirety, into the present application.

BACKGROUND OF THE INVENTION

1. Field of the Invention

The present invention relates to a light guide film and a backlight unit including a light guide film.

2. Description of the Related Art

A flat panel display such as a liquid crystal display device (LCD) has been more widely used as a space-saving image display device having low power consumption. Further, in a recent liquid crystal display device, it is required to make a LCD flexible, that is, to impart flexibility to a LCD such that a surface of the LCD can be formed to have various curved surfaces. As a result, for example, the LCD can be provided in a bent portion such as a windshield of a vehicle or the design quality can be improved.

On the other hand, in a recent liquid crystal display device, in order to improve the performance of a LCD, a further reduction in power consumption is required.

As a method of reducing the power consumption of a LCD, a method (local dimming) of dividing a backlight unit of a LCD into a plurality of regions and adjusting the brightness of the backlight unit per region according to a scene of a video is disclosed.

As a configuration of a backlight unit capable of local dimming, a direct backlight configuration in which light emitting diode (LED) elements are arranged in a planar shape immediately below a liquid crystal panel may be adopted. However, in the configuration in which LED elements are arranged in a planar shape, there are problems in that, for example, the thickness of a LCD increases, the costs required for a plurality of LED elements increase, or a halo in which light of a backlight unit leaks to an adjacent area to brighten an unintended portion occurs. In particular, unlike a display image of a liquid crystal display for a television, a liquid crystal display for an on-vehicle meter frequently displays a clear sign and/or a clear image having a large difference in brightness, and a halo is easily conspicuous.

In addition, as a configuration of a backlight unit capable of local dimming, there is disclosed is a configuration including: a plurality of emission portions that are arranged in a planar shape; and a light guide portion that guides light to a rear surface side of each of the emission portions, in which the brightness of each of the emission portions is adjusted by causing light to be independently incident into each of the light guide portions.

For example, WO2011/058960A discloses a lighting device including: a plurality of light sources that are arranged in an end portion; a plurality of light guide portions that are arranged in an arrangement direction of the light sources and into which light from the light sources is incident; and a plurality of light output portions that are arranged along a direction intersecting the arrangement direction of the light sources and emit light from the light guide portions, in which the plurality of light output portions include at least a first light output portion that is arranged relatively close to the light source side and a second light output portion that is arranged relatively farther away from the light source side with respect to the first light output portion, and the plurality of light guide portions include at least a first light guide portion that is optically connected to the first light output portion and a second light guide portion that is optically connected to the second light output portion.

In WO2011/058960A, the light guide portions are arranged on a rear surface side of the light output portions.

SUMMARY OF THE INVENTION

However, it was found that, in a case where a backlight unit including a plurality of emission portions (light output portions) and a plurality of light guide portions that are arranged on a rear surface side of the emission portions is made to be flexible, there is a problem in that a positional relationship between the emission portions and the light guide portions deviates, for example, in case of being bent or receiving an impact.

In a case where the positional relationship between the emission portions and the light guide portions deviates, light from the light guide portions which form a set cannot be made to be appropriately incident into the emission portions. In addition, the light guide portions are arranged on the rear surface side of the emission portions. Therefore, the emission portions and another set of light guide portions that are wired below the emission portions may come into unintended contact with each other in case of being bent. Therefore, unintended light may be incident into the emission portions.

This way, in a case where a backlight unit including a plurality of emission portions and a plurality of light guide portions that are arranged on a rear surface side of the emission portions is made to be flexible, an appropriately amount of light cannot be made to be incident into each of the plurality of emission portions, and there is a problem in that the adjustment of the brightness per region (local dimming) cannot be appropriately performed.

The present invention has been made in consideration of the above-described circumstances, and an object thereof is to provide: a light guide film that is bendable, has a strong resistance to impact, can perform the adjustment of the brightness per region, in particular, the adjustment of the brightness of a clear sign and/or a clear image having a large difference in brightness, and can prevent the occurrence of a halo; and a backlight unit.

The present inventors conducted a thorough investigation in order to achieve the above-described object and found that the above-described object can be achieved with a light guide film comprising: a plurality of optical units each of which includes a light guide portion and an emission portion; and a resin portion that is filled between the optical units adjacent to each other, in which the light guide portion guides light incident from a light source to the emission portion, the emission portion emits light guided and incident from the light guide portion from a light emission surface, the plurality of optical units are arranged in a plane direction of the light emission surfaces such that the light emission surfaces of the emission portions are parallel to each other, and the light guide portions and the emission portions are arranged in the plane direction of the light emission surfaces, thereby completing the present invention.

That is, the present inventors found that the object can be achieved with the following configurations.

(1) A light guide film comprising:
a plurality of optical units each of which includes a light guide portion and an emission portion; and
a resin portion that is filled between the optical units adjacent to each other,
in which the light guide portion guides light incident from a light source to the emission portion,
the emission portion emits light guided and incident from the light guide portion from a light emission surface,
the plurality of optical units are arranged in a plane direction of the light emission surfaces such that the light emission surfaces of the emission portions are parallel to each other, and
the light guide portions and the emission portions are arranged in the plane direction of the light emission surfaces.

(2) The light guide film according to (1),
in which the emission portion has a light extraction structure for emitting light from the light emission surface.

(3) The light guide film according to (1) or (2),
in which the emission portion and the light guide portion of each of the optical units are joined to each other.

(4) The light guide film according to (3),
in which the emission portion and the light guide portion of each of the optical units are joined to each other at a plurality of positions in a direction parallel to a light advancing direction in the light guide portion, and
a distance between junction portions adjacent to each other decreases toward the light advancing direction in the light guide portion.

(5) The light guide film according to (3),
wherein the light guide portion of each of the optical units has a light extraction structure for emitting light toward the emission portion.

(6) The light guide film according to (1) or (2),
in which the emission portion and the light guide portion of each of the optical units are distant from each other, and
the resin portion is filled between the emission portion and the light guide portion.

(7) The light guide film according to (6),
in which the light guide portion has a light extraction structure for emitting light toward the emission portion.

(8) The light guide film according to any one of (1) to (7),
in which a height of the light guide portion in a direction perpendicular to the light emission surface is 2 mm or less, and
a width of the light guide portion in a direction perpendicular to a light advancing direction in the light guide portion is 5 mm or less.

(9) The light guide film according to any one of (1) to (8),
in which the plurality of optical units are covered with the resin portion.

(10) The light guide film according to (9),
in which a thickness of a portion of the resin portion laminated on the optical unit is 40 µm or more.

(11) The light guide film according to any one of (1) to (10),
in which a material forming the resin portion has a lower refractive index than a material forming the optical unit.

(12) The light guide film according to any one of (1) to (11), further comprising:
a substrate film,
in which the plurality of optical units are arranged on one main surface of the substrate film.

(13) A backlight unit comprising:
the light guide film according to any one of (1) to (12); and
a plurality of light sources that emits light toward each of the plurality of light guide portions of the optical units of the light guide film.

(14) The backlight unit according to (13),
in which the light source is a light emitting diode or a semiconductor laser.

According to the present invention, it is possible to provide: a light guide film that is bendable, has a strong resistance to impact, can perform the adjustment of the brightness per region, in particular, the adjustment of the brightness of a clear sign and/or a clear image having a large difference in brightness, and can prevent the occurrence of a halo; and a backlight unit.

DESCRIPTION OF THE PREFERRED EMBODIMENTS

Figure 1:
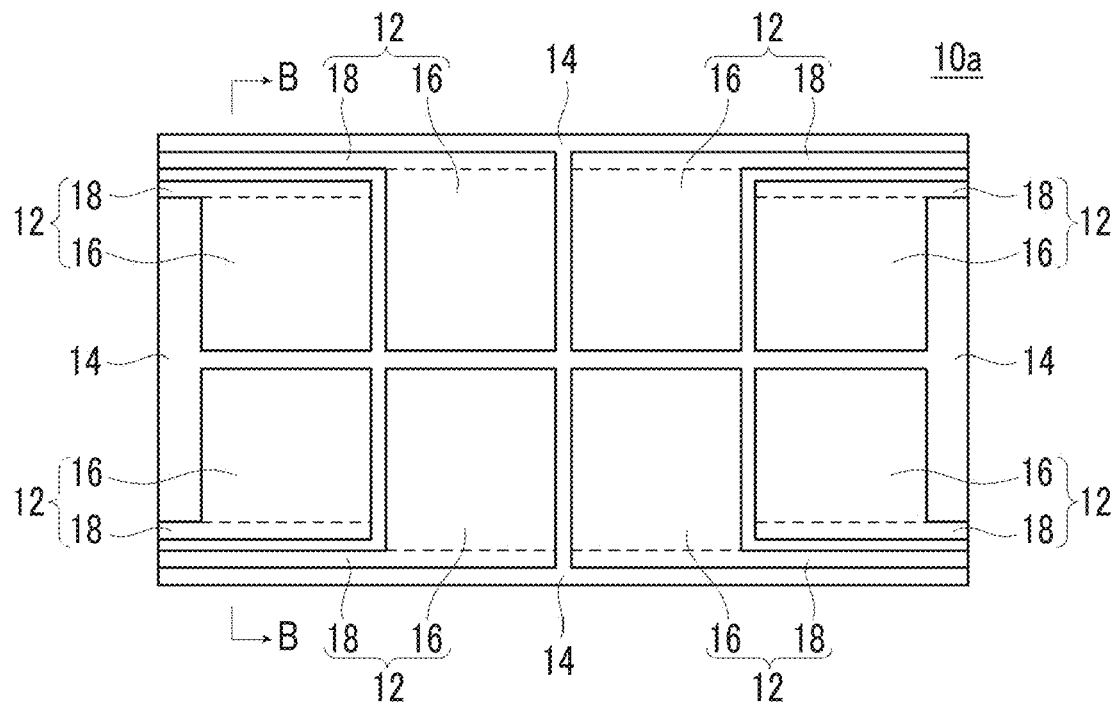
FIG. 1 is a plan view schematically illustrating an example of a light guide film according to the present invention.

Hereinafter, an embodiment of a light guide film and a backlight unit according to the present invention will be described with reference to the drawings. In the drawings of this specification, dimensions of respective portions are appropriately changed in order to easily recognize the respective portions. In this specification, numerical ranges represented by "to" include numerical values before and after "to" as lower limit values and upper limit values.

<Light Guide Film>

The light guide film according to the embodiment of the present invention comprises: a plurality of optical units each of which includes a light guide portion and an emission portion; and a resin portion that is filled between the optical units adjacent to each other, in which the light guide portion guides light incident from a light source to the emission portion, the emission portion emits light guided and incident from the light guide portion from a light emission surface, the plurality of optical units are arranged in a plane direction of the light emission surfaces such that the light emission surfaces of the emission portions are parallel to each other, and the light guide portions and the emission portions are arranged in the plane direction of the light emission surfaces.

Figure 2:
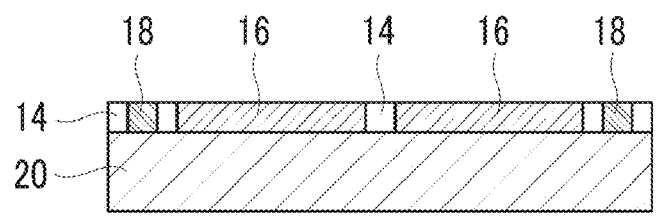
FIG. 2 is a cross-sectional view taken along line B-B of FIG. 1.

FIG. 1 is a plan view schematically illustrating an example of a light guide film 10 according to the embodiment of the present invention. FIG. 2 is a cross-sectional view taken along line B-B of FIG. 1.

The light guide film 10 according to the embodiment of the present invention includes: a plurality of optical units 12 each of which includes a light guide portion 18 and an emission portion 16; a resin portion 14; and a substrate film 20.

In an example illustrated in FIG. 1, one end surface of the light guide portion 18 protrudes from a side surface of a light guide film 10a and functions as a light incident surface. In addition, a part of one side surface of the light guide portion 18 far from the light incident surface is joined to a side surface of the emission portion 16 to face each other.

Figure 3:
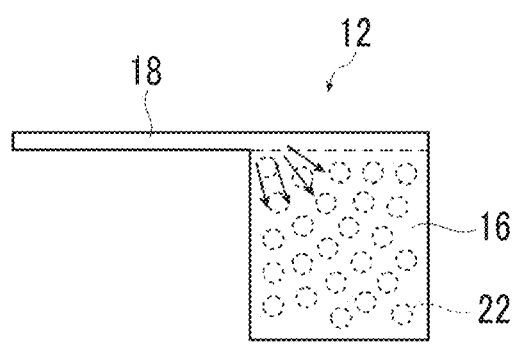
FIG. 3 is an enlarged plan view illustrating one optical unit included in the light guide film illustrated in FIG. 1.

FIG. 3 is an enlarged plan view illustrating one optical unit 12.

As illustrated in FIG. 3, the optical unit 12 includes a flat emission portion 16 and a linear (rod-shaped) light guide portion 18.

In the light guide portion 18, light emitted from a light source is incident from one end surface, and the incident light is guided to the emission portion 16.

The emission portion 16 emits light guided by the light guide portion 18 and incident from the side surface from a light emission surface.

In an example illustrated in FIG. 3, in the emission portion 16, the shape of main surfaces as maximum surfaces is rectangular, and one main surface is arranged on the substrate film 20 side. In addition, a main surface of the emission portion 16 opposite to the substrate film 20 is the light emission surface. Accordingly, in the example illustrated in FIG. 3, light is emitted from the emission portion 16 in a direction perpendicular to the paper plane.

In addition, in the example illustrated in FIG. 3, on a back surface (surface opposite to the light emission surface) of the emission portion, a light extraction structure 22 for controlling a light advancing direction such that light incident from the side surface is emitted from the light emission surface.

Here, the emission portion 16 and the light guide portion 18 of the optical unit 12 are arranged in a plane direction of the light emission surface (hereinafter, also simply referred to as "plane direction").

In addition, in the example illustrated in FIGS. 1 and 2, the light guide film 10 includes eight optical units 12, and the eight optical units 12 are arranged in a 2×4 pattern on one main surface of the substrate film 20. By arranging the optical units 12 on the substrate film 20, the light emission surfaces of the emission portions 16 are parallel to each other.

Accordingly, the plurality of emission portions 16 and the plurality of light guide portions 18 are arranged in the plane direction of the light emission surfaces. That is, in the light guide film according to the embodiment of the present invention, the plurality of emission portions 16 and the plurality of light guide portions 18 are not laminated in a thickness direction and are arranged such that the plurality of emission portions 16 and the plurality of light guide portions 18 do not overlap each other in a case where the light guide film is seen from a direction perpendicular to the light emission surfaces.

In addition, the plurality of optical units 12 are formed such that optical units 12 adjacent to each other are at a predetermined distance from each other and the emission portions 16 occupy most part of a main surface of the light guide film 10a. Therefore, the emission portion 16 of each of the optical units 12 has a size less than that of each of eight areas into which the main surface of the light guide film 10a is divided in a 2×4 pattern.

The distance of the optical units 12 adjacent to each other is preferably 0.001 mm to 1.0 mm and more preferably 0.001 mm to 0.95 mm.

The resin portion 14 is filled between the optical units 12 adjacent to each other. A surface of the optical unit 12 opposite to the substrate film 20 is formed to be flush with a surface of the resin portion 14 opposite to the substrate film 20, and a surface of the light guide film 10 opposite to the substrate film 20 is formed flat.

As described above, in a case where a backlight unit capable of local dimming and including a plurality of emission portions and a plurality of light guide portions that are arranged on a rear surface side of the emission portions is made to be flexible, there is a problem in that a positional relationship between the emission portions and the light guide portions deviates, for example, in case of being bent or receiving an impact.

In a case where the positional relationship between the emission portions and the light guide portions deviates, light from the light guide portions which form a set cannot be made to be appropriately incident into the emission portions. In addition, the light guide portions are arranged on the rear surface side of the emission portions. Therefore, the emission portions and another set of light guide portions that are wired below the emission portions may come into unintended contact with each other in case of being bent. Therefore, unintended light may be incident into the emission portions.

This way, in a case where a backlight unit including a plurality of emission portions and a plurality of light guide portions that are arranged on a rear surface side of the emission portions is made to be flexible, an appropriately amount of light cannot be made to be incident into each of the plurality of emission portions, and there is a problem in that the adjustment of the brightness per region (local dimming) cannot be appropriately performed.

On the other hand, in the light guide film according to the embodiment of the present invention, the light guide portions and the emission portions of the plurality of optical units are arranged in the plane direction of the light emission surfaces such that the light guide portions and the emission portions do not overlap each other in the thickness direction, and the resin portions is filled between the optical units.

By arranging the light guide portions and the emission portions in the plane direction of the light emission surfaces such that they do not overlap each other in the thickness direction, even in a case where the light guide film is bent, the contact between the emission portions and the light guide portions can be suppressed. In addition, by providing the resin portion that is filled between the optical units, even in a case where the light guide film is formed in a thin film shape, the deviation of a positional relationship between the emission portions and the light guide portions, for example, in case of being bent or receiving an impact can be prevented.

Accordingly, the light guide film according to the embodiment of the present invention has a strong resistance to impact and can appropriately perform the adjustment (local dimming) of the brightness per region even in case of being bent.

In addition, in a configuration in which a plurality of point light sources such as LEDs are arranged immediately below a liquid crystal panel, the dependency of an emission angle at which light is emitted from each of the point light sources on the LED light sources is high. Therefore, in order to uniformly irradiate the entire surface of the liquid crystal panel with light, it is necessary to widen the emission angle at which light is emitted from each of the point light sources. However, in a case where the emission angle at which light is emitted from each of the point light sources is wide, light is likely to leak to an adjacent area, and a halo may occur. On the other hand, with the configuration including the optical units that guide light, surface light can be emitted to the liquid crystal panel. Therefore, it is not necessary to widen the emission angle at which light is emitted from the optical units (emission portions), and the light emission direction can be controlled. Thus, the leakage of light to an adjacent area can be suppressed, and the occurrence of a halo can be prevented.

Here, the light guide film 10a illustrated in FIG. 1 includes eight optical units 12 and has a configuration in which the eight optical units 12 are arranged in the plane direction in a 2×4 pattern. However, the number and the arrangement pattern of the optical units 12 are not limited to this configuration.

The number of the optical units 12 only has to be 2 or more and, from the viewpoint of obtaining the effect of reducing power consumption by local dimming, is preferably 2 to 1600 and more preferably 8 to 600.

In addition, the arrangement pattern of the optical units 12 is not particularly limited and may be appropriately adjusted according to the size of the main surface of the light guide film, the size and shape of the emission portion 16 of the optical unit 12, and the like.

In the following description, the arrangement pattern of the optical units is represented by the number in the vertical direction×the number in the horizontal direction on the paper plane.

Figure 4:
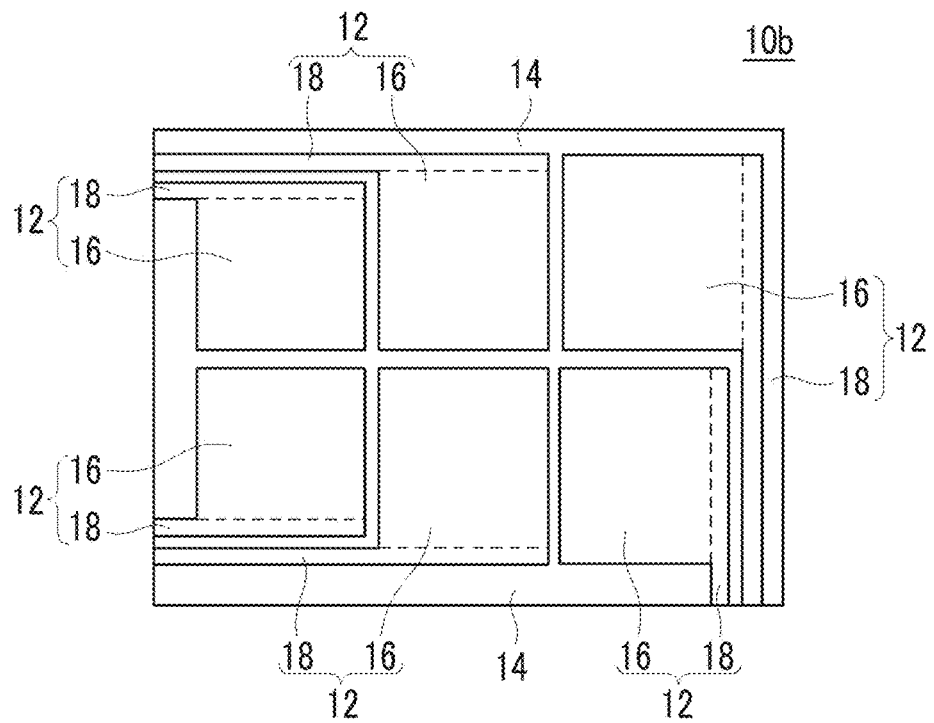
FIG. 4 is a plan view schematically illustrating another example of the light guide film according to the present invention.

For example, as in a light guide film 10b illustrated in FIG. 4, six optical units 12 may be arranged in a 2×3 pattern. For example, as in a light guide film 10c illustrated in FIG. 5, 12 optical units 12 may be arranged in a 3×4 pattern.

Figure 5:
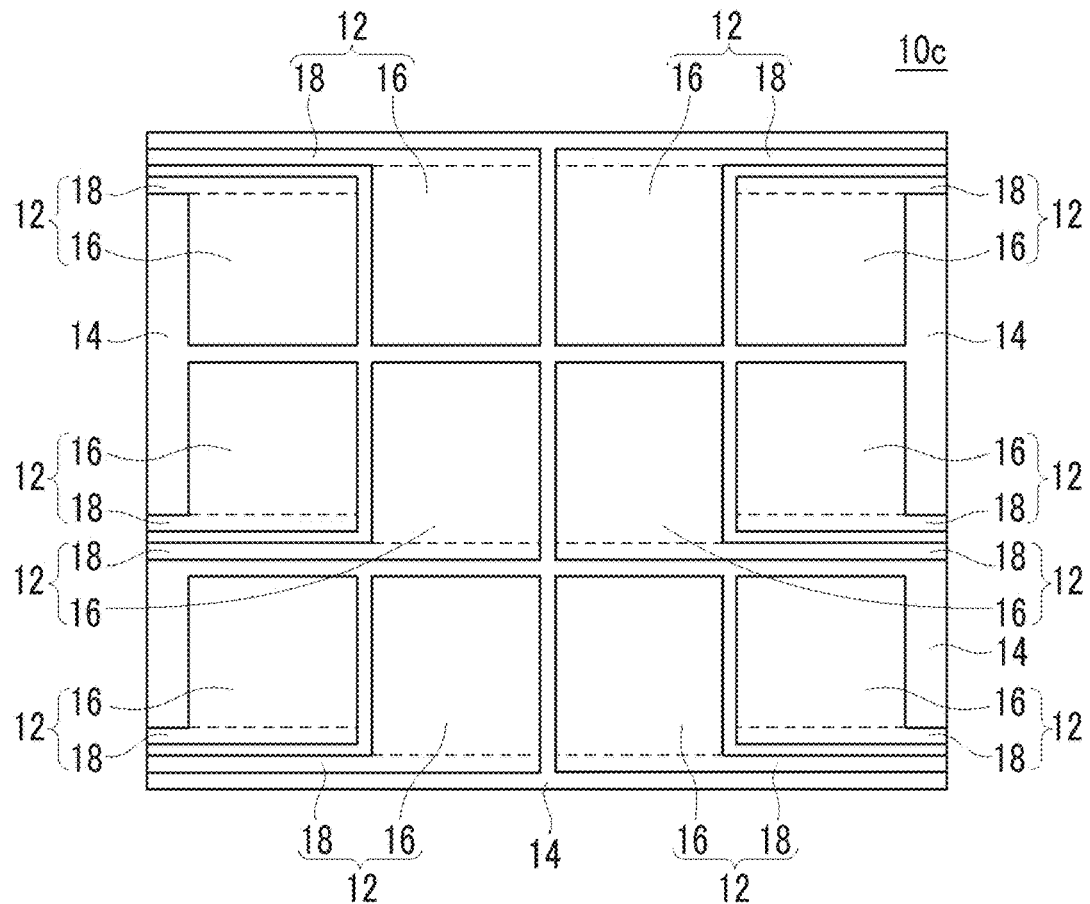
FIG. 5 is a plan view schematically illustrating still another example of the light guide film according to the present invention.

In a case where four sides of one optical unit 12 are surrounded by other optical units 12 as in the light guide film 10c illustrated in FIG. 5, that is, in a case where the optical units are arranged in a pattern of 3×3 or more, it is necessary that the light guide portion 18 of the optical unit 12 of which the four sides are surrounded by other optical units 12 is wired between other two optical units 12.

For example, in the example illustrated in FIG. 5, four sides of each of two optical units 12 positioned at a position of 2×2 and a position of 2×3 are surrounded by other optical units 12. The light guide portion 18 of the optical unit 12 positioned at a position of 2×2 is wired between the optical unit 12 positioned at a position of 1×2 and the optical unit 12 positioned at a position of 1×3. In addition, the light guide portion 18 of the optical unit 12 positioned at a position of 2×3 is wired between the optical unit 12 positioned at a position of 4×2 and the optical unit 12 positioned at a position of 4×3.

This way, in a case where the optical units are arranged in a pattern of 3×3 or more, it is necessary to wire the light guide portions on a rear surface side of another emission portions in the configuration of the related art in which the light guide portions are arranged on the rear surface side of the emission portions. Therefore, in case of being bent, there is likely to be the problem that the emission portions and another set of light guide portions that are wired below the emission portions come into contact with each other.

The light guide film according to the embodiment of the present invention can solve the above-described problem, and thus is more suitably applicable to the configuration in which the optical units are arranged in a pattern of 3×3 or more.

From the viewpoint that the effect of reducing power consumption by local dimming can be obtained and the total area of the emission portions with respect to the total area of the light guide film can increase, it is preferable that the optical units are arranged in a pattern of 2×4 to 28×56.

Figure 6:
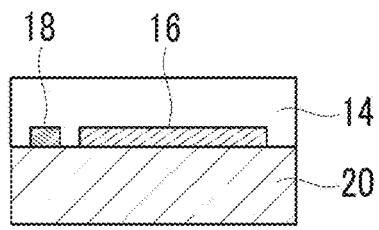
FIG. 6 is a partial cross-sectional view illustrating still another example of the light guide film.
Figure 7:
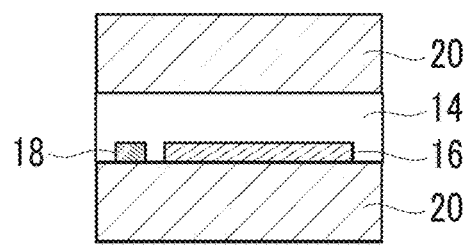
FIG. 7 is a partial cross-sectional view illustrating still another example of the light guide film.

In addition, in the example illustrated in FIG. 2, the optical units 12 (the emission portions 16 and the light guide portions 18) and the resin portion 14 are formed to be flush with each other. However, the present invention is not limited to this example. For example, as illustrated in FIG. 6, the surface of the optical unit 12 may be covered with the resin portion 14. Further, as illustrated in FIG. 7, another substrate film 20 may be provided on the resin portion 14 covering the optical unit 12.

Figure 8:
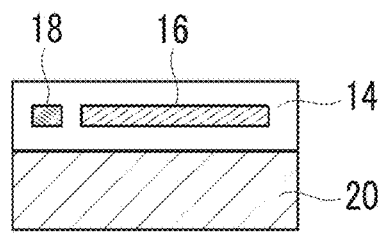
FIG. 8 is a partial cross-sectional view illustrating still another example of the light guide film.
Figure 9:
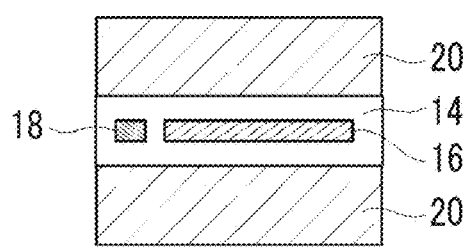
FIG. 9 is a partial cross-sectional view illustrating still another example of the light guide film.

In addition, in the example illustrated in FIG. 2, the optical unit 12 is directly arranged on one main surface of the substrate film 20. However, the present invention is not limited to this example. For example, as illustrated in FIG. 8, a configuration may be adopted in which the resin portion 14 is laminated on one main surface of the substrate film 20, the optical unit 12 is laminated on the resin portion 14, and the surface of the optical unit 12 is covered with the resin portion 14. That is, the optical unit 12 may be embedded in the resin portion 14. Further, as illustrated in FIG. 9, another substrate film 20 may be provided on the resin portion 14 covering the surface of the optical unit 12.

In a case where the optical unit 12 is covered with the resin portion 14, the thickness of a portion of the resin portion 14 laminated on the optical unit is preferably 40 μm or more. By covering the optical unit 12 with the resin portion 14 and adjusting the thickness of the resin portion 14 of the portion laminated on the optical unit 12 to be 40 μm or more, the light emission surface of the emission portion 16 can be prevented from being scratched and a decrease in light use efficiency can be suppressed.

Figure 10:
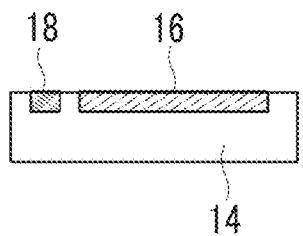
FIG. 10 is a partial cross-sectional view illustrating still another example of the light guide film.
Figure 11:
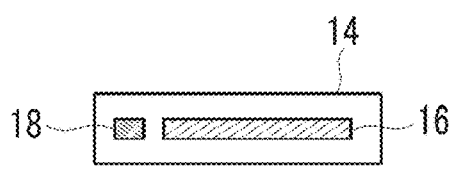
FIG. 11 is a partial cross-sectional view illustrating still another example of the light guide film.

In addition, in the example illustrated in FIG. 2, the substrate film 20 is provided. However, the present invention is not limited to this example. As illustrated in FIGS. 10 and 11, only optical unit 12 and the resin portion 14 are provided without providing the substrate film 20.

In an example illustrated in FIG. 10, one main surface of the optical unit 12 is formed to be flush with the resin portion 14, and another surface of the optical unit 12 is covered with the resin portion 14.

In an example illustrated in FIG. 11, both surfaces of the optical units 12 are covered with the resin portion 14.

In addition, in the example illustrated in FIG. 3, in the optical unit 12, a part of one side surface of the light guide portion 18 far from the light incident surface is joined to the entire area of a side surface of the emission portion 16. However, the present invention is not limited to this example.

Figure 12:
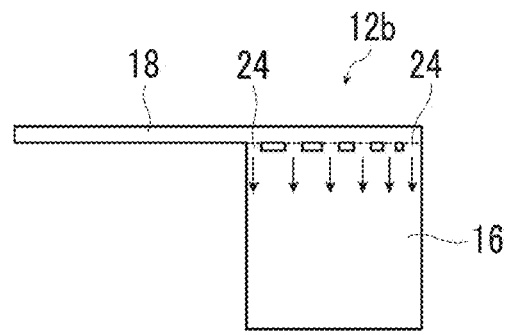
FIG. 12 is a plan view illustrating another example of the optical unit.

As in an optical unit 12b illustrated in FIG. 12, the emission portion 16 and the light guide portion 18 may include a plurality of junction portions 24 in a direction parallel to the light advancing direction in the light guide portion 18. In other word, a configuration may be adopted in which one side surface of the light guide portion 18 and one side surface of the emission portion are joined to each other, and a plurality of hole portions are formed in the junction portion along the light advancing direction in the light guide portion 18.

At this time, it is preferable that the distance between junction portions 24 adjacent to each other in the light guide portion decreases toward the light advancing direction.

In a case where the side surface of the light guide portion 18 is joined to the side surface of the emission portion 16 as in the example illustrated in FIG. 3, light incident into the emission portion 16 is similar to light emitted from a point light source. Therefore, there is room for improvement in the uniformity of light emitted from the light emission surface of the emission portion 16.

On the other hand, in a case where the emission portion 16 and the light guide portion 18 includes a plurality of junction portions 24 in a direction parallel to the light advancing direction in the light guide portion 18 as in an example illustrated in FIG. 12, light is incident from the plurality of junction portions 24 into the emission portion 16. Therefore, incident into the emission portion 16 is similar to light emitted from a line light source. Therefore, the uniformity of light emitted from the light emission surface of the emission portion 16 can be improved.

Figure 13:
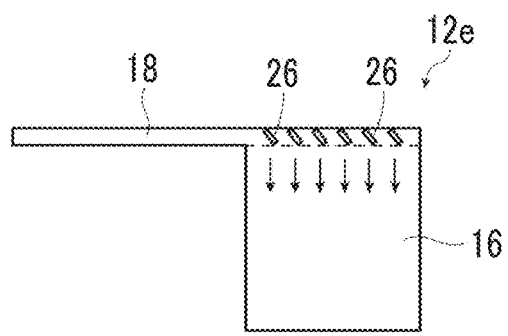
FIG. 13 is a plan view illustrating still another example of the optical unit.

As in an optical unit 12e illustrated in FIG. 13, a plurality of light extraction structures 26 may be provided in a portion of the light guide portion 18 facing the emission portion 16.

At this time, it is preferable that, by investigating a light distribution from the light guide portion 18 to the light guide portion 16 in a case where the plurality of light extraction structures are not provided, the light extraction structures are formed such that light is distributed in a direction in which light of the emission portion 16 is not distributed (is not likely to be distributed). For example, in the case of the example illustrated in FIG. 3, it is preferable that the density of the plurality of light extraction structures 26 gradually decreases toward the light advancing direction in the light guide portion 18 such that light is distributed toward the surface of the emission portion 16 on the light incident surface side of the light guide portion 18. In addition, it is preferable that the lengths of the light extraction structures 26 gradually decrease toward the light advancing direction in the light guide portion 18.

As in the example of FIG. 13, by providing the plurality of light extraction structures 26 in the portion of the light guide portion 18 facing the emission portion 16, the light advancing direction can be made to move toward the emission portion 16 due to the plurality of light extraction structures 26. As a result, incident into the emission portion 16 is similar to light emitted from a line light source. Therefore, the uniformity of light emitted from the light emission surface of the emission portion 16 can be improved.

In addition, in the example illustrated in FIG. 3, the light guide portion 18 and the emission portion 16 are joined to each other. However, the present invention is not limited to this example. As in an example illustrated in FIGS. 14 and 15, the light guide portion 18 and the emission portion 16 may be distant from each other. In a case where the light guide portion 18 and the emission portion 16 are distant from each other, the resin portion 14 is filled between the light guide portion 18 and the emission portion 16.

Figure 14:
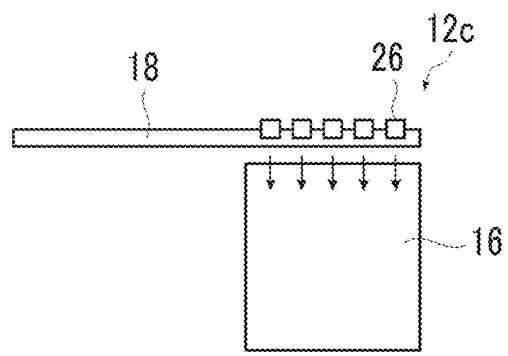
FIG. 14 is a plan view illustrating still another example of the optical unit.

In an optical unit 12c illustrated in FIG. 14, one side surface of the light guide portion 18 and one side surface of the emission portion 16 are disposed to be adjacent to and face each other. The light extraction structures 26 are provided on a side surface of the light guide portion 18 opposite to a side surface facing the emission portion 16, and light guided in the light guide portion 18 is emitted from the side surface of the light guide portion 18 toward the side surface of the emission portion 16.

Figure 15:
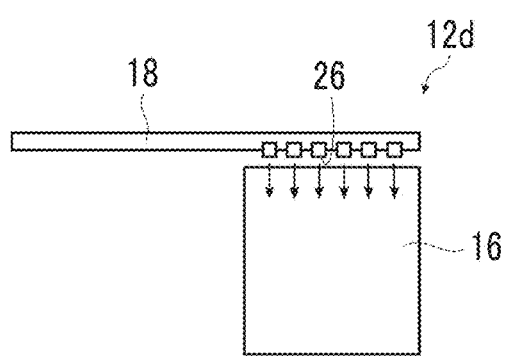
FIG. 15 is a plan view illustrating still another example of the optical unit.

In addition, an optical unit 12d illustrated in FIG. 15 has the same configuration as the optical unit 12c of FIG. 14, except that the light extraction structures 26 are formed on a side surface of the light guide portion 18 facing the emission portion 16.

In each of the aspects of the optical unit, the light extraction structures 26 may be arranged on the side surface of the light guide portion 18, or a part of the light extraction structures 26 may be embedded in the light guide portion 18 as illustrated in FIGS. 14 and 15. By providing the light extraction structures 26 such that a part thereof is embedded in the light guide portion 18, light guided in the light guide portion 18 is likely to come into contact with the light extraction structures 26, and light can be more suitably directed toward the emission portion 16.

This way, in a case where the light guide portion 18 and the emission portion 16 are distant from each other, the distance between the light guide portion 18 and the emission portion 16 is preferably 0.001 mm to 1.0 mm and more preferably 0.001 mm to 0.95 mm.

Figure 16:
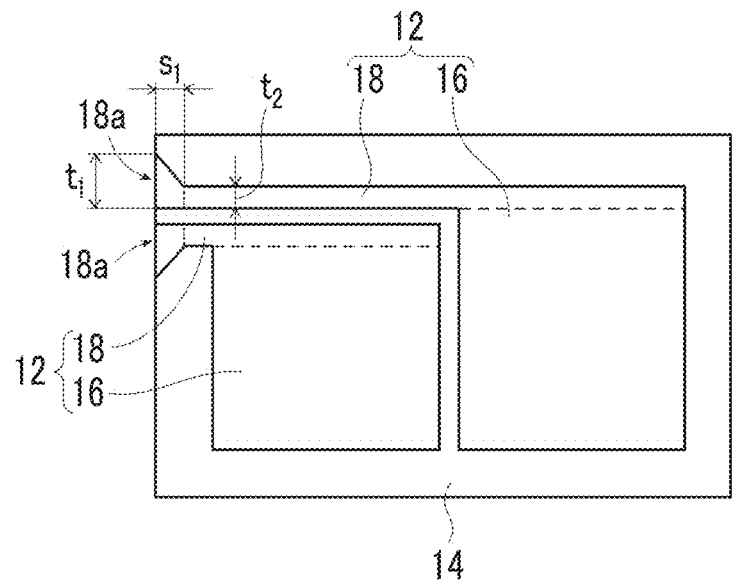
FIG. 16 is a partial plan view illustrating still another example of the light guide film.
Figure 17:
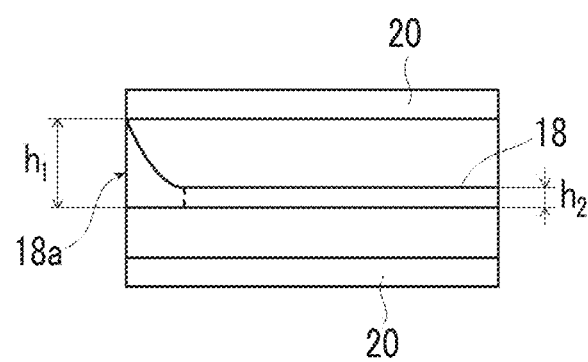
FIG. 17 is a partial cross-sectional view illustrating still another example of the light guide film.

In addition, as illustrated in FIGS. 16 and 17, it is preferable that a portion of the light guide portion 18 in the vicinity of the light incident surface has a shape in which the area of a cross-section perpendicular to the light advancing direction increases toward a light incident surface 18a such that the area of the light incident surface 18a increases.

This way, by increasing the area of the light incident surface 18a, light emitted from a light source can be efficiently received.

In addition, the height of the light guide portion 18 in a direction perpendicular to the light emission surface is preferably 2 mm or less, and the width of the light guide portion 18 in a direction perpendicular to the light advancing direction in the light guide portion 18 is preferably 5 mm or less.

Here, in a case where the portion of the light guide portion 18 in the vicinity of the light incident surface has a shape in which the cross-sectional area increases toward the light incident surface 18a, assuming that, in the light incident surface 18a, the width in a direction perpendicular to the light advancing direction is represented by $t_1$, the height in a direction perpendicular to the light emission surface is represented by $h_1$, the depth of a portion having a large cross-sectional area is represented by $s_1$, the width of a rod-shaped portion having a uniform cross-sectional area in a direction perpendicular to the light advancing direction other than the portion in the vicinity of the light incident surface is represented by $t_2$, and the height in a direction perpendicular to the light emission surface is represented by h2 (refer to FIGS. 16 and 17), the values thereof are as follows.

The width $t_1$ is preferably 0.1 mm to 5 mm and more preferably 1 mm to 3 mm.

The height $h_1$ is preferably 0.1 mm to 2 mm and more preferably 0.1 mm to 0.5 mm.

The depth $s_1$ is preferably 0.1 mm to 5 mm and more preferably 0.1 mm to 4 mm.

The width $t_2$ is preferably 0.001 mm to 1 mm and more preferably 0.001 mm to 0.95 mm.

The height $h_2$ is preferably 0.001 mm to 1 mm and more preferably 0.001 mm to 0.95 mm.

In addition, in the example illustrated in FIG. 1, the shape of the emission portion 16 in a plan view is rectangular. However, the present invention is not limited to this example, and the shape of the emission portion 16 may be a polygonal shape such as a triangular shape or a hexagonal shape. Alternatively, the shape may be a circular shape or an elliptical shape. Alternatively, the shape may be unstructured. Alternatively, the shape may be a shape of a character such as an alphabet, a Chinese character, a katakana, a hiragana, or a number or a sign such as a star shape, a heart shape, or a cross shape. Alternatively, the shape may be a shape obtained by cutting a shape of a character and/or a sign.

In addition, the shapes of the emission portions 16 of the respective optical units 12 in a plan view may be the same as or different from each other.

From the viewpoint that, for example, the total area of the emission portions with respect to the total area of the light guide film can increase, it is preferable that the shape of the emission portion in a plan view is rectangular.

In addition, the shape of a cross-section of the light guide portion 18 perpendicular to a longitudinal direction (light advancing direction) is not particularly limited and may be a polygonal shape such as a rectangular shape, a triangular shape, or a hexagonal shape. Alternatively, the shape may be a circular shape or an elliptical shape.

In addition, the length of the light guide portion 18 of each of the optical units 12 may be appropriately set according to the arrangement of the optical units 12.

Hereinafter, each of the components of the light guide film according to the embodiment of the present invention will be described.

—Optical Unit—

The optical unit 12 includes the emission portion 16 and the light guide portion 18. The light guide portion 18 and the emission portion 16 are basically formed of the same material but may be formed of different materials. Hereinafter, the materials of the light guide portion 18 and the emission portion 16 will be collectively described as a material forming the optical unit 12.

As the material forming the optical unit 12, a well-known material that is used as a material forming a light guide plate can be appropriately used.

For example, an optically transparent resin such as polyethylene terephthalate (PET), polypropylene (PP), polycarbonate (PC), polymethyl methacrylate (PMMA), benzyl methacrylate, a MS resin, or a cycloolefin polymer (COP) can be used.

In addition, in order to suitably guide light into the optical unit 12, the refractive index of the material forming the optical unit 12 is higher than that of a material forming the resin portion 14. From this viewpoint, the material forming the optical unit 12 is preferably polycarbonate, an acrylic material having a high refractive index, or a fluorene acrylate.

(Light Extraction Structure)

As described above, the emission portion 16 of the optical unit 12 may include the light extraction structure 22 for emitting light from the light emission surface. In addition, the light guide portion 18 may include the light extraction structure 26 for directing light toward the emission portion 16.

The light extraction structure 22 and the light extraction structure 26 basically have the same structure, and thus will be collectively described.

As the light extraction structure, a well-known light extraction structure that is used in a light guide plate of the related art can be appropriately used.

Examples of the light extraction structure include a structure where an uneven pattern such as a prism (triangular groove shape) or a conical shape is formed, a structure where interfaces having different refractive indices are provided, and a structure where a plurality of dots having reflecting properties are discretely arranged in a predetermined pattern.

In addition, the light extraction structure may have a configuration in which scattering particles for scattering light in the optical unit are kneaded and dispersed.

In addition, in the case of the structure where the uneven pattern such as a prism is formed and the structure where the dots are arranged, the arrangement density of the uneven pattern and the arrangement density of the dots may have a distribution such that light to be emitted is uniform. Specifically, by increasing the arrangement density of the uneven pattern or the arrangement density of the dots as the distance from a position where light is incident increases, light to be emitted can be made to be uniform.

Likewise, in the case of the configuration where the scattering particles for scattering light in the optical unit are kneaded and dispersed, the density of the scattering particles may set to increase as the distance from a position where light is incident increases.

(Reflecting Layer)

In addition, in the light guide portion and the emission portion of the optical unit, a reflecting layer may be formed on side surfaces other than a surface as the light incident surface and a surface as the light emission surface.

The reflecting layer may be formed of any material as long as the material can reflect light. For example, a resin sheet having a high reflectivity in which voids are formed by kneading a filler with PET or PP and then stretching the kneaded material, a resin sheet on which a metal foil such as aluminum is supported, or a metal foil such as aluminum may be arranged on the side surfaces as the reflecting layer. Alternatively, a metal film such as aluminum may be formed by vapor deposition or the like directly on the side surfaces of the light guide portion and the emission portion.

—Resin Portion—

As the material forming the resin portion 14, a well-known resin material can be appropriately used.

Here, it is preferable that the material forming the resin portion 14 is a material having a lower refractive index than the material forming the optical unit 12.

Examples of the material forming the resin portion 14 include an optically transparent resin such as an acrylic resin or an acrylic modified silicone.

Here, a difference between the refractive index of the material forming the optical unit 12 and the refractive index of the material forming the resin portion 14 is preferably 0.001 to 0.5 and more preferably 0.01 to 0.5.

By adjusting the difference between the refractive index of the material forming the optical unit 12 and the refractive index of the material forming the resin portion 14 to be in the above-described range, light can be appropriately guided into the optical unit 12.

—Substrate Film—

It is preferable that the substrate film 20 is a belt-shaped (sheet-shaped) support having flexibility. By providing the substrate film 20, the optical unit 12 and the resin portion 14 can be supported, the strength of the light guide film can be improved, and the light guide film can be easily formed. It is preferable that at least the substrate film 20 that is arranged on the light emission surface side has transparency.

In the present invention, having transparency represents that the total light transmittance in a visible range is 80% or higher. The visible range refers to a wavelength range of 380 nm to 780 nm. The light transmittance used as an index for transparency can be measured using a method described in JIS-K 7105. That is, using an integrating sphere light transmittance measuring device, the total light transmittance and the scattered light amount are measured, and the diffuse transmittance is subtracted from the total light transmittance to obtain the light transmittance. The details of the support having flexibility can be found in paragraphs "0046" to "0052" of JP2007-290369A and paragraphs "0040" to "0055" of JP2005-096108A.

Examples of the substrate film include substrate films formed of triacetyl cellulose (TAC), polyethylene terephthalate (PET), polycarbonate, polyvinyl chloride, acryl, polyolefin, glass, and the like.

<Method of Forming Light Guide Film>

Figure 18:
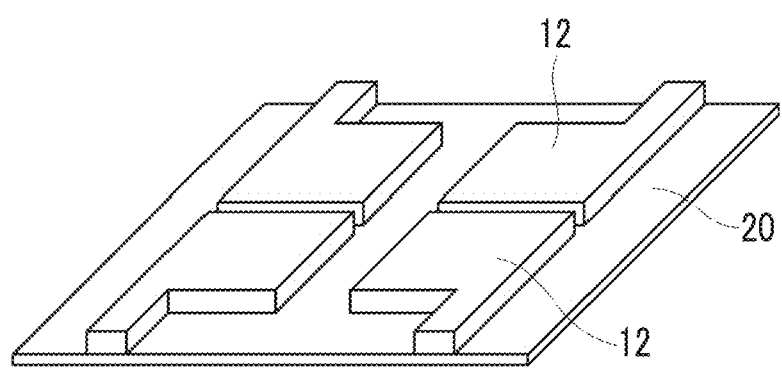
FIG. 18 is a schematic diagram illustrating a method of preparing the light guide film.
Figure 19:
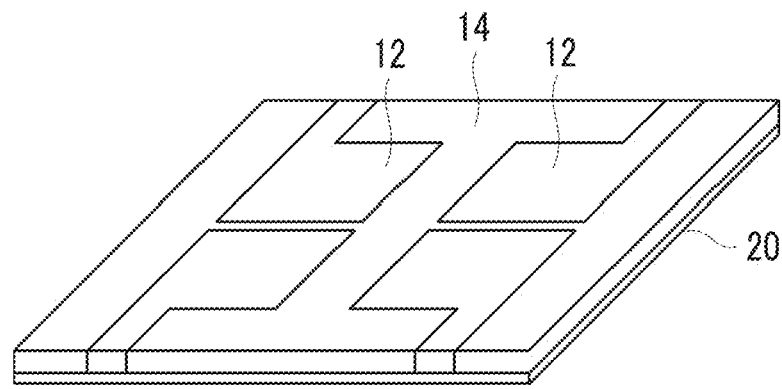
FIG. 19 is a schematic diagram illustrating the method of preparing the light guide film.

Next, an example of steps of forming the light guide film according to the embodiment of the present invention will be described with reference to FIGS. 18 and 19.

(Coating Solution Preparing Step)

In the coating solution preparing step, an optical unit-forming coating solution for forming the optical unit and a resin portion-forming coating solution for forming the resin portion are prepared. The optical unit-forming coating solution and the resin portion-forming coating solution may include an organic solvent or may not include an organic solvent. In this step, by melting and kneading a polymer composition, an optical unit-forming composition may be prepared.

(Optical Unit Forming Step)

Next, the optical unit-forming coating solution is applied to the substrate film 20, a mold having an uneven pattern is pressed into contact with the applied optical unit-forming coating solution to form a predetermined pattern, and the optical unit-forming coating solution is cured. As a result, as illustrated in FIG. 18, a laminated film in which the plurality of optical units 12 are formed on the substrate film 20 is formed.

(Resin Portion Forming Step and Substrate Bonding Step)

Next, the resin portion-forming coating solution is applied between the plurality of optical units 12 of the laminated film, the substrate film 20 is bonded to the laminated film before curing the resin portion-forming coating solution, and the resin portion-forming coating solution is cured to form the resin portion 14. As a result, the light guide film is formed.

In the curing process of the optical unit forming step and the resin portion forming step, thermally curing, photocuring using ultraviolet light, or the like may be appropriately selected according to the coating solution.

The temperature, the heating time, and the like for thermally curing may be appropriately set according to the forming materials.

The kind of light, the irradiation dose, and the like for photocuring may be appropriately set according to the forming materials.

The above-described steps may be continuously performed with a so-called roll-to-roll (RtoR) method using an elongated substrate film, or may be performed with a so-called sheet type using a cut sheet-shaped substrate film.

In addition, in a case where the steps are performed using the RtoR method, all the steps may be continuously performed using the RtoR method. Alternatively, the film may be wound in a roll shape after the optical unit forming step, and then the resin portion forming step may be formed on the wound roll using the RtoR method.

In addition, the continuous (elongated) light guide film obtained using the RtoR method may be cut using a cutter as necessary.

Herein, in the example of the above-described forming method, the coating solution is applied to the substrate film, and the mold is pressed thereinto to cure the coating solution. However the present invention is not limited to this example. The coating solution for forming the optical unit is cast between the substrate film and the mold and is photo-cured while pressing the mold. Further, the coating solution may be cured by further heating the coating solution after light irradiation.

In addition, the pattern can also be formed using an ink jet method or a dispenser method.

In addition, as a method of applying the coating solution to the substrate film, a generally well-known application method such as a dip coating method, an air knife coating method, a curtain coating method, a wire bar coating method, a gravure coating method, an extrusion coating method, a spin coating method, a slit scanning method, or a cast method, or an ink jet method can be used. In addition, the coating solution may be applied by multiple coating. Further, for example, another organic layer such as a planarizing layer may be formed between the substrate film and the coating layer.

In addition, before the optical unit forming step, a step of forming the flat resin portion 14 on the substrate film 20 may be provided. That is, the flat resin portion 14 may be formed on the substrate film 20, the plurality of optical units 12 may be formed on the flat resin portion 14, and the resin portion 14 may be formed between the plurality of optical units 12.

In addition, as the mold, a mold having a pattern to be transferred is used. The pattern on the mold can be formed, for example, by photolithography, electron beam lithography, or the like depending on a desired processing accuracy. However, a mold pattern forming method is not particularly limited.

A light-transmitting mold material is not particularly limited as long as it has a predetermined strength and durability. Specific examples of the light-transmitting mold material include glass, quartz, an optically transparent resin such as PMMA or a polycarbonate resin, a transparent metal deposited film, a flexible film such as polydimethylsiloxane, a photocured film, and a metal film such as stainless steel (SUS).

On the other hand, a light non-transmitting mold material is not particularly limited as long as it has a predetermined strength. Specific examples of the non-transmitting mold material include a ceramic material, a deposited film, a magnetic film, a reflection film, a metal substrate such as Ni, Cu, Cr, or Fe, and a substrate formed of SiC, silicon, silicon nitride, polysilicon, silicon oxide, amorphous silicon, or the like. In addition, the shape of the mold is not particularly limited may be either a plate shape or a roll shape. The roll-shaped mold is applied particularly in a case where continuous productivity of transfer is required.

A mold having undergone a mold release treatment in order to improve releasability between the curable compound and the mold surface may be used. As the mold, a mold treated with a silane coupling agent such as silicon silane coupling agent or a fluorine silane coupling agent, for example, a commercially available release agent such as OPTOOL DSX (manufactured by Daikin Industries, Ltd.) and Novec EGC-1720 (manufactured by Sumitomo 3M Ltd.) can be preferably used.

<Backlight Unit>

Figure 20:
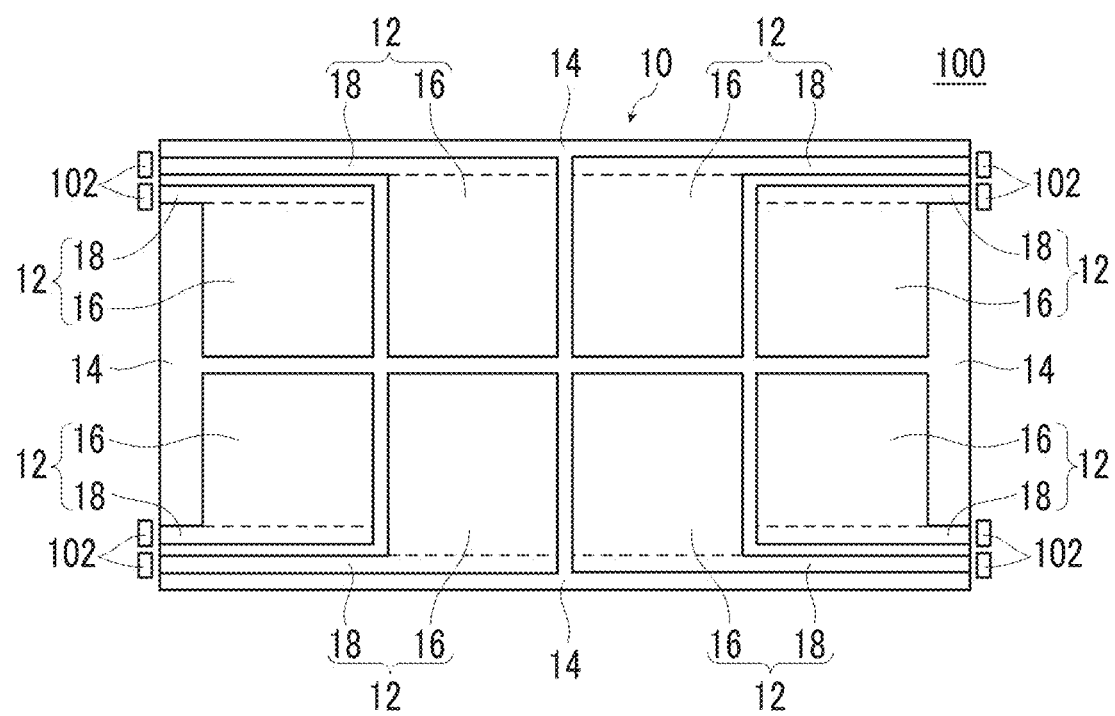
FIG. 20 is a plan view schematically illustrating an example of a backlight unit according to the present invention.

A backlight unit including the light guide film according to the embodiment of the present invention will be described with reference to the drawings. FIG. 20 is a schematic diagram illustrating a schematic configuration of the backlight unit.

As illustrated in FIG. 20, a backlight unit 100 includes: a plurality of light sources 102 that emit light; and the light guide film 10 that guides and emits light emitted from the light source 102.

The backlight unit 100 may include various functional films or the like used in a well-known backlight unit in addition to the light guide film 10 and the light sources 102. For example, the backlight unit 100 may include a reflection plate that is provided on a surface of the light guide film 10 opposite to the light emission surface. In addition, for example, a diffusion film or a prism sheet may be provided on the light emission surface side of the light guide film 10.

In FIG. 20, the plurality of light sources 102 are arranged to correspond to the plurality of optical units 12 of the light guide film 10, respectively. That is, each of the light sources 102 is arranged to face a position where the light incident surface of the light guide portion 18 of each of the optical units 12 is provided.

Light emitted from each of the light sources 102 is incident from the light incident surface into each of the light guide portions 18, and the incident light is guided in the light guide portion 18 to be incident into the emission portion 16. The light emission surface incident into the emission portion 16 is emitted from the light emission surface as one main surface of the emission portion 16. As a result, surface light is emitted from the light guide film 10.

At this time, by adjusting the light amount of each of the light sources 102 per optical unit according to a scene of a video, local dimming can be performed.

Figure 21:
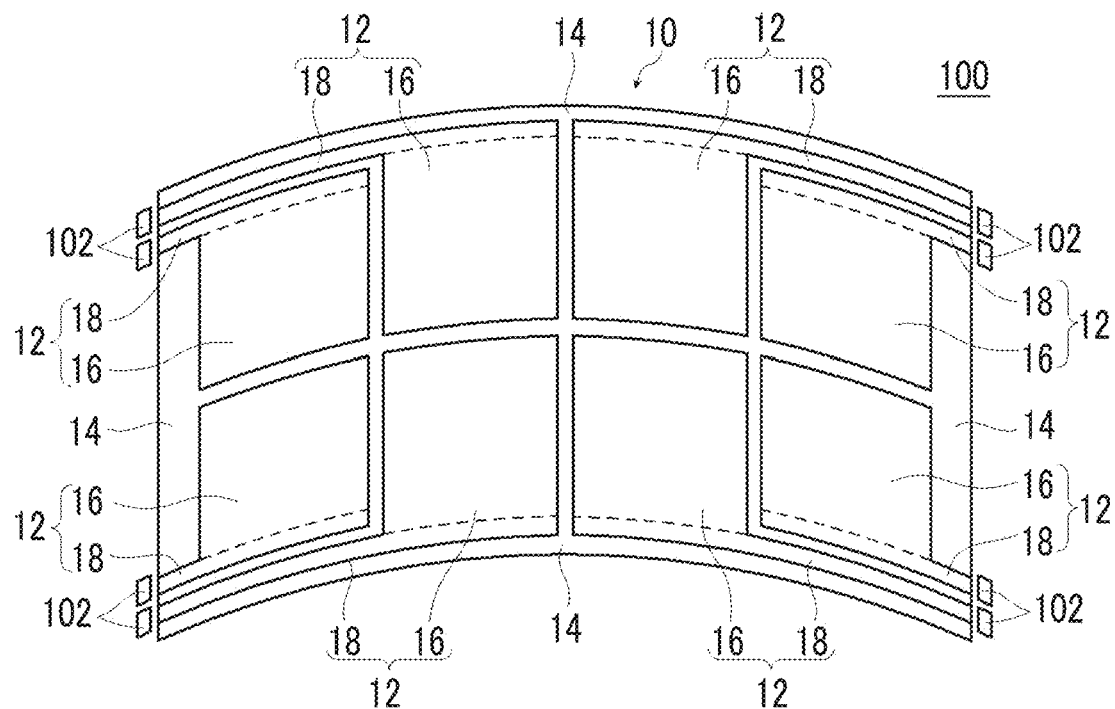
FIG. 21 is a diagram schematically illustrating a state where the backlight unit illustrated in FIG. 20 is bent.

Here, in the present invention, even in a case where the light guide film 10 (backlight unit) is bent as illustrated in FIG. 21, the adjustment of the brightness per region can be appropriately performed.

The light source is not particularly limited. From the viewpoint that, for example, light can be made to be suitably incident into the small light incident surface of the light guide portion 18, a point light source such as a light emitting diode (LED) or a semiconductor laser (LD) is preferably used. Alternatively, as the light source, an LED having a small emission surface with a size of 100 µm×100 µm or less may be used. As a result, light can be made to be incident into the small light incident surface of the light guide portion 18 without light loss.

In addition, the color of light to be emitted from the light source is not particularly limited, but white light is preferable. Examples of the LED that emits white light include a LED chip in which an yttrium-aluminum-garnet (YAG) fluorescent material is applied to a surface of a GaN light emitting diode, an InGaN light emitting diode, or the like.

In addition, in an example illustrated in FIG. 20, one light source 102 is arranged for one optical unit 12. However, the present invention is not limited to this example, and two or more light sources may be arranged for one optical unit 12. For example, three RGB light sources may be arranged for one optical unit 12 to realize white light.

In addition, although not illustrated in the drawing, a lens for guiding light emitted from a light source to the light incident surface may be provided between the light source and the light guide portion. The lens may be a refractive lens or a diffractive lens. From the viewpoint of power-saving, a diffractive lens is preferable. As the diffractive lens, a lens in which an uneven structure such as a blazed diffraction grating is provided may be used, or a phase diffractive lens that is prepared by providing a distribution in refractive index may be used. As the phase diffractive lens, for example, photo-alignment liquid crystal may be used (Optica November 2015, Vol. 2, No. 11, P958) may be used, which is preferable because a lens can be formed as a polymerizable liquid crystal thin film (<10 µm).

In addition, in the example illustrated in FIG. 1, all the plurality of optical units 12 are arranged on one substrate film 20. However, the present invention is not limited to this example, and the plurality of optical units 12 may be provided on any one of two or more substrate films. In other words, a plurality of light guide films according to the embodiment of the present invention may be laminated.

Figure 22:
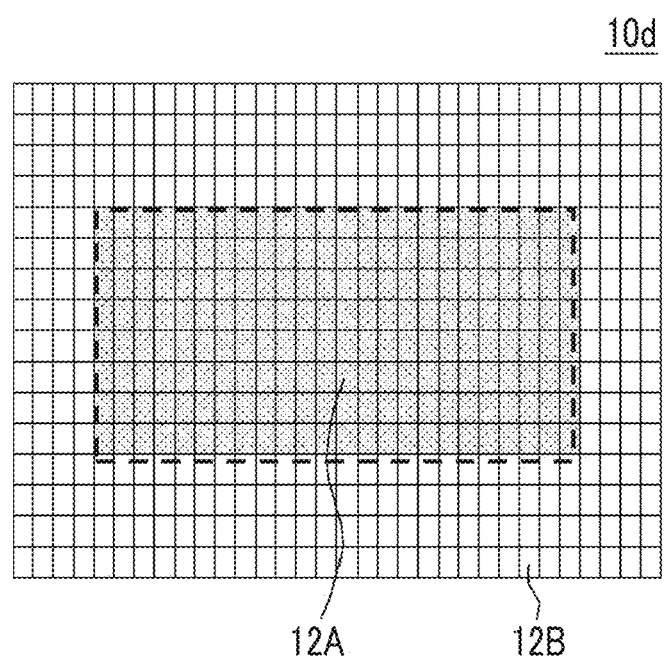
FIG. 22 is a plan view schematically illustrating still another example of the light guide film according to the present invention.
Figure 23:
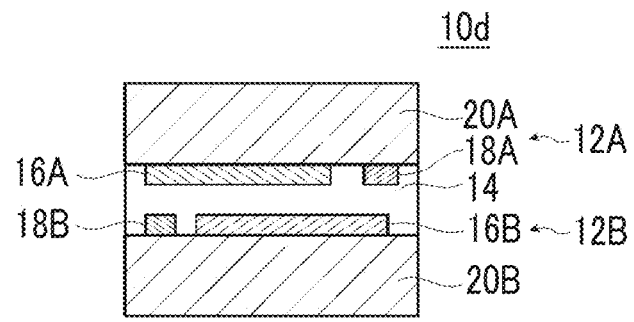
FIG. 23 is a cross-sectional view illustrating a part of FIG. 22.

For example, in an example illustrated in FIGS. 22 and 23, a light guide film 10d includes a plurality of optical units including the emission portions 16 that are arranged in a pattern of 16×32. The emission portion 16 is rectangular.

In this light guide film 10d, optical units 12A (12Aa to 12Ah; collectively referred to as 12A in a case where it is not necessary to distinguish between 12Aa to 12Ah) including emission portions 16A that arranged in a center portion (region surrounded by a broken line) in the plane direction, specifically, the optical units 12A that arranged inside a line formed by connecting positions of 5×5, 5×28, 12×28, and 12×5 are formed on a first substrate film 20A, and optical units 12B (12Ba to 12Bh; collectively referred to as 12B in a case where it is not necessary to distinguish between 12Ba to 12Bh) including emission portions 16B that are arranged outside the optical units 12A are formed on a second substrate film 20B.

Specifically, the optical units 12B formed on the second substrate film 20B will be described using FIGS. 24 to 26.

Figure 24:
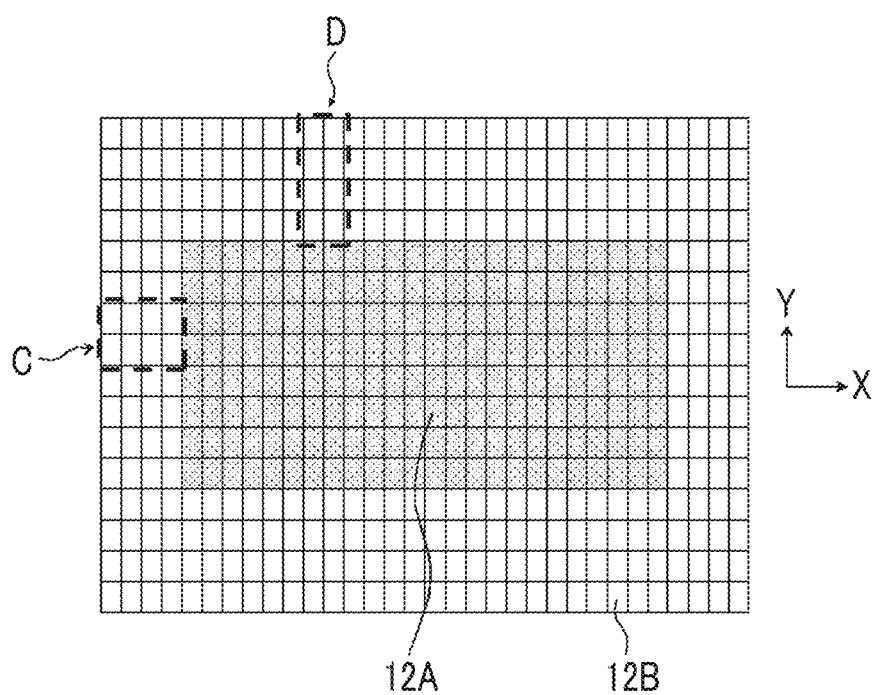
FIG. 24 is a plan view illustrating positions of the optical units.
Figure 25:
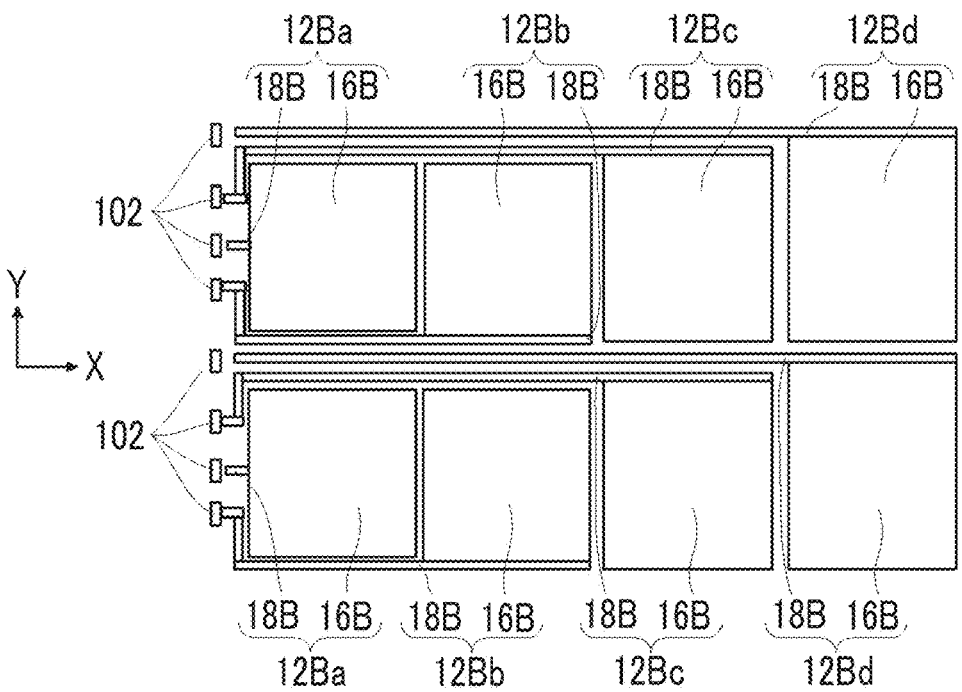
FIG. 25 is a plan view illustrating optical units in a region C of FIG. 24.
Figure 26:
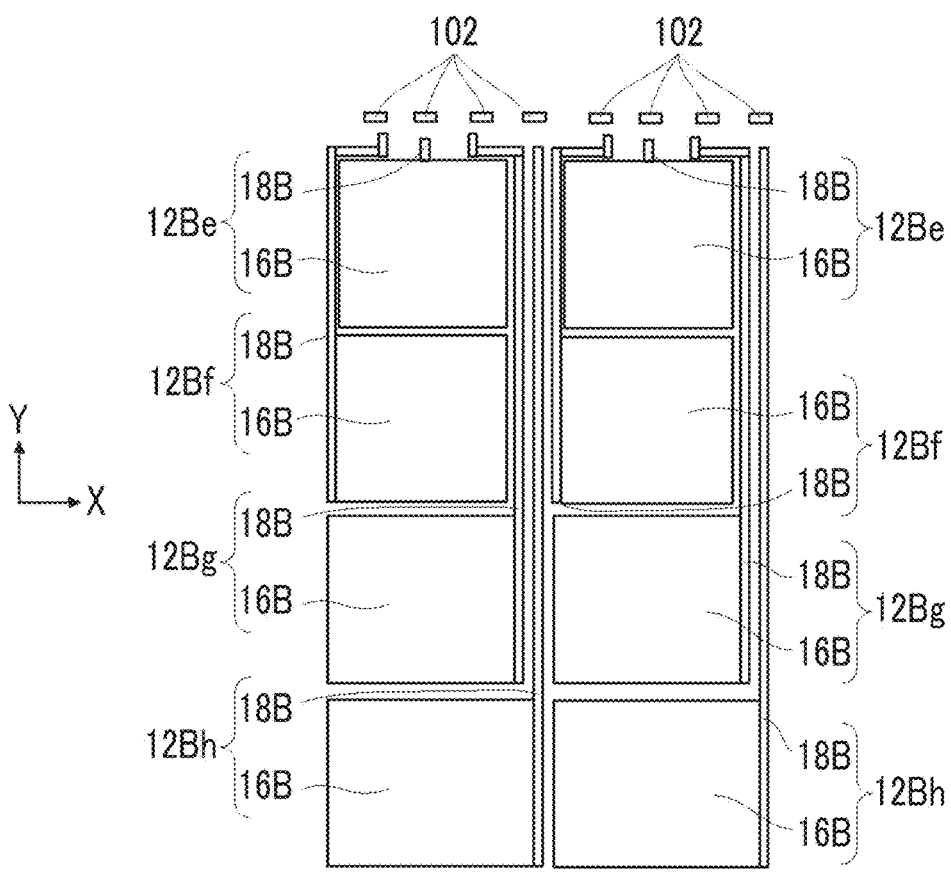
FIG. 26 is a plan view illustrating optical units in a region D of FIG. 24.

FIG. 25 illustrates the arrangement of the optical units 12B in a region C surrounded by a broken line in FIG. 24, and FIG. 26 illustrates the arrangement of the optical units 12B in a region D in FIG. 24. In FIGS. 24 to 29, a left-right direction in FIG. 24 is indicated by arrow X, and an up-down direction is indicated by arrow Y.

In the optical units 12B that are arranged on the left end portion side of FIG. 24 as in the region C, as illustrated in FIG. 25, four optical units 12B arranged in the left-right direction form a set, and a light guide portion 18B of each of the optical units 12B extends from the emission portion 16B up to the left side surface of the light guide film 10d. In the optical units 12B that are also arranged on the right end portion side of FIG. 24, similarly, the light guide portion 18B extends up to the right side surface of the light guide film 10d.

In the optical units 12B that are arranged on the upper end portion side of FIG. 24 as in the region D, as illustrated in FIG. 26, four optical units 12B arranged in the up-down direction form a set, and the light guide portion 18B of each of the optical units 12B extends from the emission portion 16B up to the upper side surface of the light guide film. In the optical units 12B that are also arranged on the lower end portion side of FIG. 24, similarly, the light guide portion 18B extends up to the lower side surface of the light guide film 10d.

Next, the optical units 12A formed on the first substrate film 20A will be described using FIGS. 27 to 29.

Figure 27:
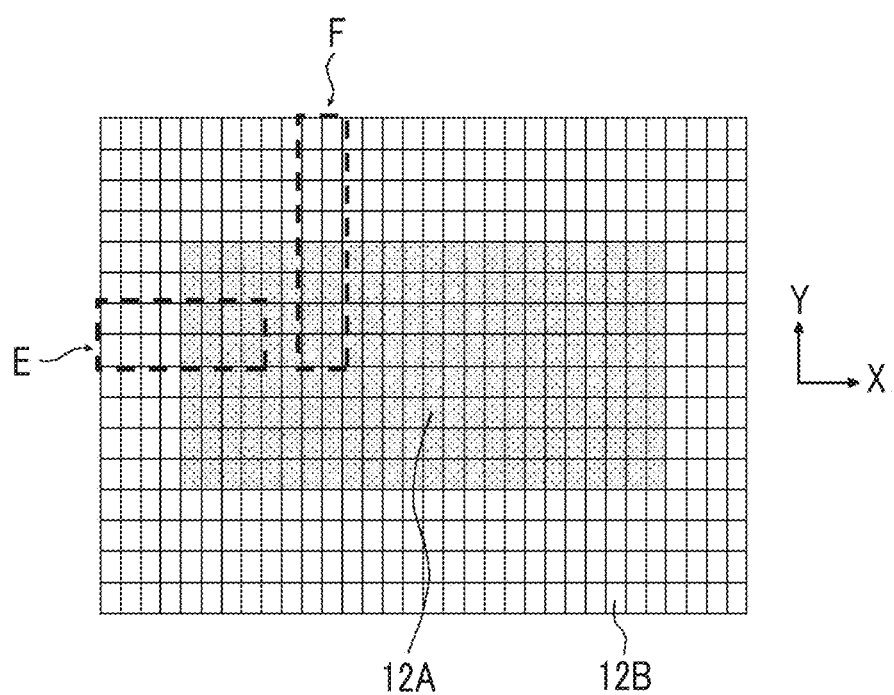
FIG. 27 is a plan view illustrating positions of the optical units.
Figure 28:
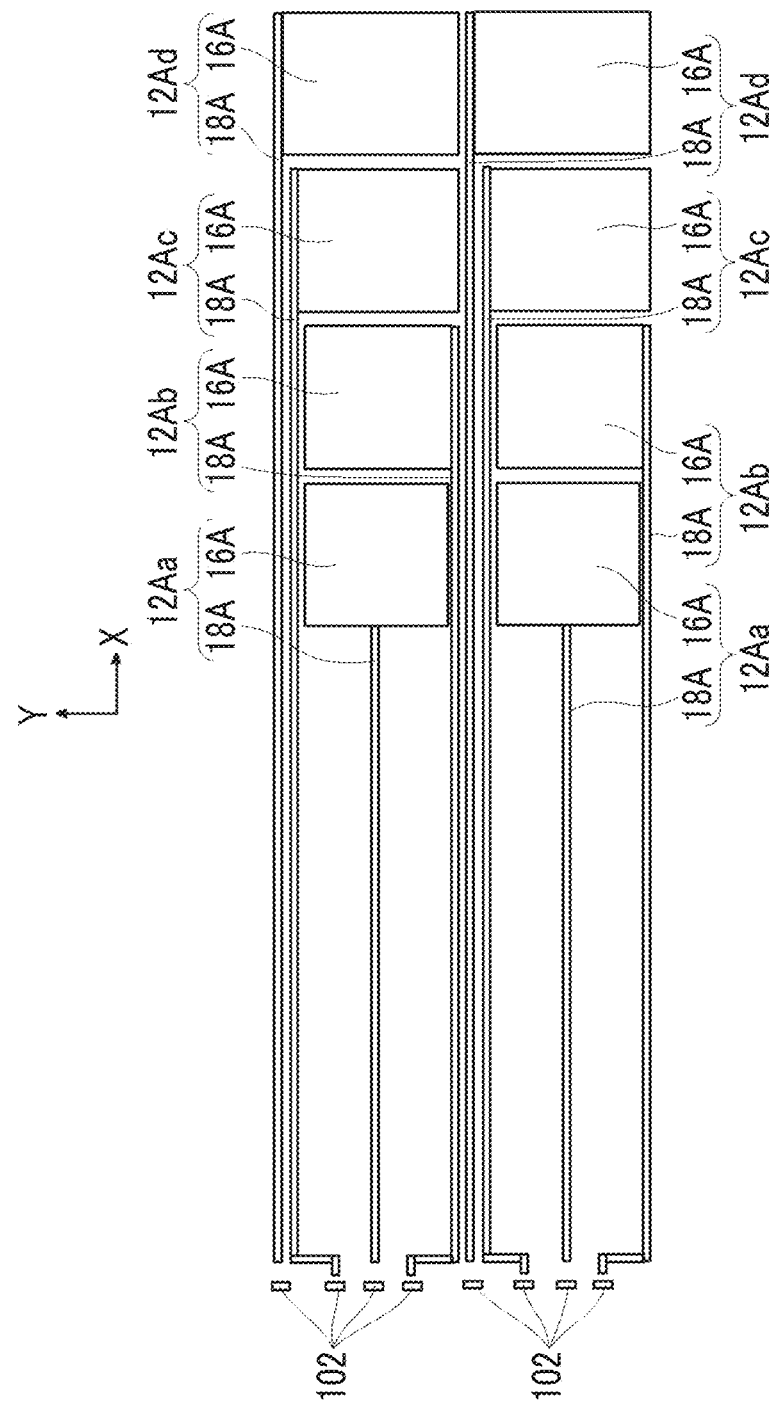
FIG. 28 is a plan view illustrating optical units in a region D of FIG. 27.
Figure 29:
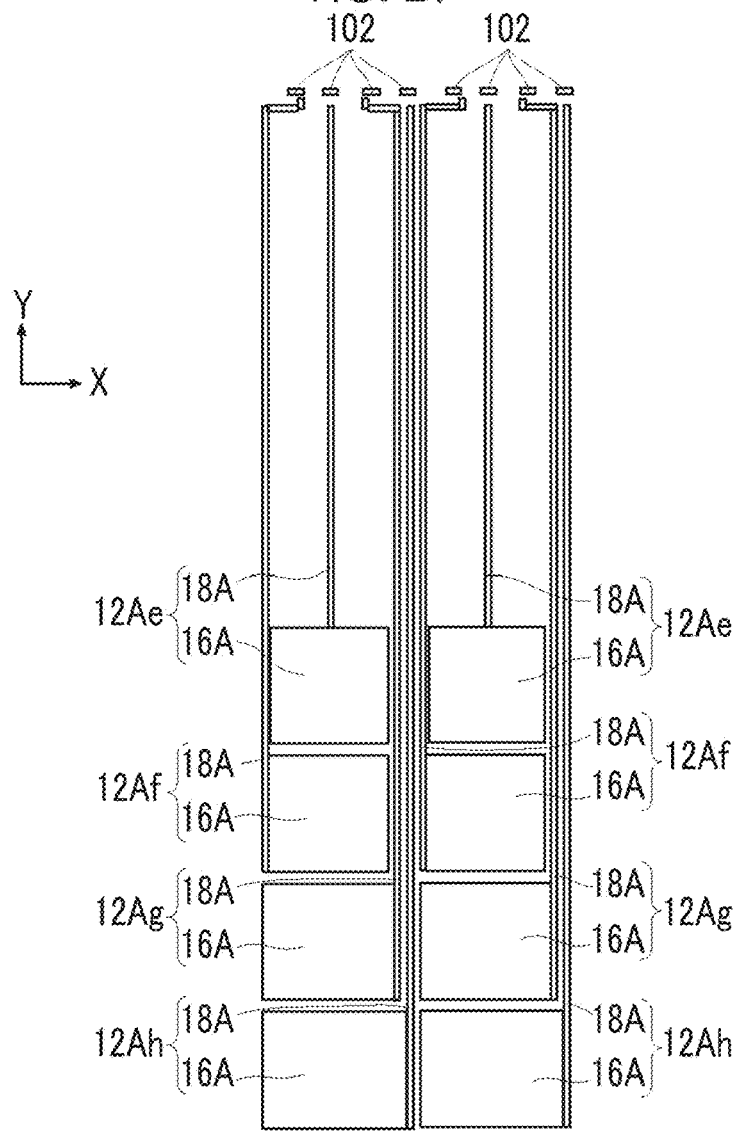
FIG. 29 is a plan view illustrating optical units in a region E of FIG. 28.

FIG. 28 illustrates the arrangement of the optical units 12A in a region E surrounded by a broken line in FIG. 27, and FIG. 29 illustrates the arrangement of the optical units 12A in a region F in FIG. 27.

In the optical units 12A that are arranged on the left end portion side of FIG. 27 as in the region E, as illustrated in FIG. 28, four optical units 12A arranged in the left-right direction form a set, and a light guide portion 18A of each of the optical units 12A extends from the emission portion 16A up to the left side surface of the light guide film 10d. In the optical units 12A that are also arranged on the right end portion side of FIG. 27, similarly, the light guide portion 18A extends up to the right side surface of the light guide film 10d.

In the optical units 12A that are arranged on the upper end portion side of FIG. 27 as in the region F, as illustrated in FIG. 29, four optical units 12A arranged in the up-down direction form a set, and the light guide portion 18A of each of the optical units 12A extends from the emission portion 16A up to the upper side surface of the light guide film 10d. In the optical units 12A that are also arranged on the lower end portion side of FIG. 27, similarly, the light guide portion 18A extends up to the lower side surface of the light guide film 10d.

The first substrate film 20A on which the plurality of optical units 12A are formed and the second substrate film 20B on which the plurality of optical units 12B are formed are laminated through the resin portion 14 such that surfaces on the optical unit side face each other as illustrated in FIG. 23. Here, an arrangement pattern of the plurality of optical units 12A in the plane direction formed on the first substrate film 20A and an arrangement pattern of the plurality of optical units 12B in the plane direction formed on the second substrate film 20B are different from each other, and the plurality of optical units 12A and the plurality of optical units 12B are arranged in a predetermined pattern in the plane direction. As a result, the light guide film 10d in which 16×32 optical units 12 (emission portions 16) are arranged in the plane direction can be obtained.

By arranging the plurality of optical units 12 on any one of two or more substrate films, a large number of the optical units 12 can be easily arranged in the plane direction. In addition, the degree of freedom for the form of local dimming can be improved.

EXAMPLES

Hereinafter, the present invention will be described in detail using examples. Materials, used amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of Light Guide Film>

In Example 1, a light guide film in which optical units were arranged in a 2×4 pattern as illustrated in FIG. 1 was prepared. In a laminate structure, as in the example illustrated in FIG. 17, the optical units 12 were embedded in the resin portion 14, and the substrate film 20 was laminated on both surfaces of the resin portion 14.

In addition, in the prepared light guide film, as illustrated in FIG. 1, the light incident surface 18a of each of four optical units 12 on the left side in the drawing was formed on the left side surface of the light guide film, and the light incident surface of each of four optical units 12 on the right side in the drawing was formed on the right side surface of the light guide film.

As illustrated in FIG. 1, the length of the light guide portions of the four optical units on the center side (side far from the light incident surface) in the left-right direction of the drawing was longer than the length of the light guide portions of the four optical units on the side surface side (side close to the light incident surface) in the left-right direction of the drawing. Hereinafter, an optical unit where the arrangement position of the emission portion is close to the light incident surface of the light guide portion will be referred to as "first optical unit", and an optical unit where the arrangement position of the emission portion is far from the light incident surface of the light guide portion will be referred to as "second optical unit"

(Substrate Film)

As the substrate film, polyethylene terephthalate (PET, manufactured by Toyobo Co., Ltd., COSMOSHINE (registered trade name) A4300, thickness: 23 µm) was used.

(Preparation of Resin Portion-Forming Coating Solution)

As the resin portion-forming coating solution, KER-4000-UV (manufactured by Shin-Etsu Chemical Co., Ltd.) was prepared. Hereinafter, this resin portion-forming coating solution will be referred to as "coating solution 1".

(Preparation of Optical Unit-Forming Coating Solution)

An optical unit-forming coating solution having the following composition was prepared as a coating solution 2.

EA-F5710 (manufactured by Osaka Gas Chemicals Co., Ltd.): 99 parts by mass

Photopolymerization initiator (IRGACURE 819 (manufactured by BASF SE)): 1 part by mass (Resin Portion Forming Step of Underlayer)

The coating solution 1 was applied to the first substrate film and then was irradiated with ultraviolet light at 2000 mJ/cm$^2$ from the first substrate film side using a 200 W/cm air-cooled metal halide lamp (manufactured by Eye Graphics Co., Ltd.) to be cured at a room temperature of 25° C. As a result, a resin portion having a thickness of 0.04 mm was formed on the first substrate film.

(Optical Unit Forming Step)

Using a photoimprint method described below, optical units were formed on the resin portion formed on the first substrate film.

First, a SUS mold on which an unevenness shape corresponding to the arrangement pattern of the optical units was formed using a photoetching method was prepared.

The unevenness shape was formed on the SUS mold such that the shape of the optical units was the following shape.

Each of eight optical units included a square emission portion and a linear light guide portion and had a shape in which a part of one side surface of the light guide portion was joined to one side surface of the emission portion to face each other. As illustrated in FIG. 1, eight emission portions were arranged in 2 rows and 4 columns. In addition, each of the eight light guide portions extended in the left-right direction of the drawing such that an end surface (light incident surface) protruded from the side surface of the light guide film. An end surface (light incident surface) of the light guide portion of each of two optical units on the upper left side of the drawing protruded from an upper left side surface of the light guide film, an end surface (light incident surface) of the light guide portion of each of two optical units on the lower left side of the drawing protruded from a lower left side surface of the light guide film, an end surface (light incident surface) of the light guide portion of each of two optical units on the upper right side of the drawing protruded from an upper right side surface of the light guide film, and an end surface (light incident surface) of the light guide portion of each of two optical units on the lower right side of the drawing protruded from a lower right side surface of the light guide film.

In the first optical unit, the emission portion had a square shape having a size of 30 mm×30 mm and a thickness of 0.125 mm, the light guide portion had a width $t_2$ of 0.125 mm, a height $h_2$ of 0.125 mm, and a length of 40 mm, and the light incident surface had a width $t_1$ of 7 mm, a height $h_1$ of 0.3 mm, and a depth $s_1$ of 5 mm. In addition, in the second optical unit, the emission portion had a square shape having a size of 30.125 mm×30.125 mm and a thickness of 0.125 mm, the light guide portion had a width $t_2$ of 0.125 mm, a height $h_2$ of 0.125 mm, and a length of 70.25 mm, and the light incident surface had a width $t_1$ of 7 mm, a height $h_1$ of 0.3 mm, and a depth $s_1$ of 5 mm.

In addition, the distance between the first optical unit and the second optical unit was 0.125 mm.

In addition, a plurality of conical uneven patterns were provided on surfaces (back surfaces) of the emission portions of the first optical unit and the second optical unit opposite to the light emission surfaces. The uneven patterns were concentrically arranged around an apex of the emission portion closest to the light incident surface of the light guide portion.

The coating solution 2 was cast between the SUS mold and the resin portion on the first substrate film using a dispenser, the SUS mold was pressed into contact with the coating solution 2 using a rubber roller at a pressure of 0.3 MPa to discharge an excess amount of the coating solution, and the mold filled with the coating solution 2 was bonded to the first substrate film. Next, the coating solution 2 was irradiated with ultraviolet light at 360 mJ/cm$^2$ from the first substrate film side using a 200 W/cm air-cooled metal halide lamp (manufactured by Eye Graphics Co., Ltd.) to be cured at a room temperature of 25° C. Next, the mold was released, and eight optical units were formed on the resin portion.

(Resin Portion Forming Step and Substrate Bonding Step)

The coating solution 1 was cast between the optical unit side of the first substrate film on which the optical units prepared in the above-described step were formed and the second substrate film using a dispenser, the SUS mold was pressed into contact with the coating solution 1 using a rubber roller at a pressure of 0.3 MPa to discharge an excess amount of the coating solution, and the coating solution 1 was filled between the first substrate film on which the optical units were formed and the second substrate film. Next, the coating solution 1 was irradiated with ultraviolet light at 2000 mJ/cm$^2$ from the first substrate film side using a 200 W/cm air-cooled metal halide lamp (manufactured by Eye Graphics Co., Ltd.) to be cured at a room temperature of 25° C. As a result, a light guide film was prepared.

Example 2

A light guide film was formed using the same method as that of Example 1, except that the first substrate film and the second substrate film were peeled off such that the resin portion was exposed as illustrated in FIG. 11.

Example 3

A light guide film was prepared using the same method as that of Example 1, except that the following acrylic resin film (lactonized polymethyl methacrylate film) having a thickness of 40 µm was used as the substrate film and the resin portion forming step of the underlayer was not performed. That is, as illustrated in FIG. 7, the light guide film was formed to have a laminate structure in which the optical units were directly formed on the first substrate film.

In order to obtain the acrylic resin film, a mixture (manufactured by Nippon Shokubai Co., Ltd.) including 90 parts by weight of a (meth)acrylic resin having a lactone ring structure [weight ratio between copolymerizable monomers: methyl methacrylate/methyl 2-(hydroxymethyl)acrylate=8/2; lactone cyclization ratio: 100%] and 10 parts by mass of an acrylonitrile-styrene (AS) resin {TOYO ASAS20, manufactured by Toyo Styrene Co., Ltd.} was melt-extruded to form a film, and the film was stretched to about 2.0 times. The thickness of the stretched film was 40 µm.

Example 4

A light guide film was prepared using the same method as that of Example 1, except that, as in an optical unit illustrated in FIG. 12, the optical unit had a configuration in which the emission portion and the light guide portion included a plurality of junction portions in a direction parallel to the light advancing direction in the light guide portion, and the conical uneven patterns formed on the back surface of the emission portion were arranged parallel to the light advancing direction in the light guide portion 18. That is, a plurality of hole portions were formed in the junction portion between the light guide portion and the emission portion along the light advancing direction.

In addition, the distance between junction portions adjacent to each other was configured to decrease toward the light advancing direction in the light guide portion. That is, the widths of the hole portions became shorter as the distance from the light incident surface increased. Specifically, the widths of the hole portions in the longitudinal direction of the light guide portion were 4.25 mm, 4.1 mm, 3.9 mm, 3.5 mm, 2.75 mm, and 0.5 mm in order from the light incident surface, respectively. In addition, the widths of the hole portions in a direction perpendicular to the longitudinal direction of the light guide portion were 0.125 mm.

In order to form the hole portions, a SUS mold in which protrusions having positions, shapes, and sizes corresponding to the hole portions were provided was prepared as the SUS mold used in the optical unit forming step, and optical units were prepared using this SUS mold.

Example 5

A light guide film was prepared using the same method as that of Example 4, except that the surface roughness Ra of all the side surfaces of the optical units was 0.6 μm and a reflecting layer formed of aluminum foil was provided on the side surfaces.

Regarding the roughening of the side surface, a surface corresponding to the SUS mold was roughened.

In addition, the reflecting layer was formed as follows.

After the optical unit forming step, a sheet that protected a portion other than the side surfaces of the optical units was bonded, and the aluminum foil was formed on the side surfaces having an adjusted surface roughness Ra of 0.6 μm using a general sputtering apparatus. Aluminum was used as a target, and argon was used as discharge gas. The deposition pressure was 0.5 Pa, and the deposition output was 400 W. The thickness of the formed film was 100 nm.

Example 6

A light guide film was prepared using the same method as that of Example 1, except that a coating solution 3 described below was used instead of the resin portion-forming coating solution.

((Meth)Acrylic Resin)

The following acrylic resin was used. MMA represents a structural unit derived from methyl methacrylate.

Manufacturing Example 1: Manufacturing of Acrylic Resin

An acrylic resin having a weight-average molecular weight of 1300000 and a MMA ratio of 100% was synthesized using the following method.

300 g of ion exchange water and 0.6 g of polyvinyl alcohol (saponification degree: 80%, polymerization degree: 1700) were added a 1 L three-neck flask equipped with a mechanical stirrer, a thermometer, and a cooling pipe and were stirred such that polyvinyl alcohol was completely dissolved. Next, 100 g of methyl methacrylate and 0.15 g of benzoyl peroxide were added, and a reaction was caused to occur at 85° C. for 6 hours. The obtained suspension was filtered through a nylon filter fabric and was cleaned with water, and the filtrate was dried at 50° C. over night. As a result, a desired polymer was obtained in the form of beads (92.0 g).

(Synthesis: Synthesis of A-30)

83 g of phenol and 5 g of n-octyl mercaptan were added to a 1 L three-neck flask equipped with a thermometer, a stirring blade, a dropping funnel, and a reflux cooling pipe, nitrogen was purged in the system, 25.2 g of 3,3,5-trimethylcyclohexanone was added, hydrogen chloride gas was blown while holding the temperature at 45° C., and a reaction was caused to occur for 4 hours. After completion of the reaction, 12 mass % sodium hydroxide aqueous solution was added to neutralize the solution, the neutralized solution was heated up to 80° C. and then was cooled up to room temperature, and deposited crystals were separated by filtration. The obtained crude crystals were dispersed and dissolved in a large amount of toluene, water was removed by azeotropic dehydration, 5 g of activated clay was added, and the reaction was refluxed and stirred for 30 minutes. Activated clay was removed by thermal filtration, 28 g of water was added to the obtained filtrate, and the obtained product was recrystallized. As a result, a compound A-30 was obtained (43 g, white crystals).

(Melting Step: Preparation of (Meth)Acrylic Resin Composition)

The following composition was charged into a mixing tank and was melted at 230 degrees. As a result, a (meth) acrylic resin composition was prepared as the coating solution 3.

(Composition of (Meth)Acrylic Resin Composition)

| | |
|---|---|
| Acrylic resin | 100 parts by mass |
| Additive A-30 | 20 parts by mass |
| KANE ACE M-210 (manufactured by Kaneka Corporation) | 15 parts by mass |

Example 7

A light guide film was prepared using the same method as that of Example 1, except that the emission portion and the light guide portion were disposed at a distance of 0.125 mm from each other as in the optical unit illustrated in FIG. 14, a plurality of uneven patterns having a triangular groove were provided as the light extraction structures to be included in the light guide portion on the side surface of the light guide portion opposite to the side surface facing the emission portion, and the uneven patterns having a triangular groove shape formed on the back surface of the emission portion were arranged parallel to the side surface where the light guide portion and the emission portion faced each other.

Example 8

A light guide film was prepared using the same method as that of Example 1, except that, as in the optical unit illustrated in FIG. 13, light extraction structures (rectangular hole portions, height: 0.125 mm, width: 0.015 mm, length: 0.018 mm, 0.022 mm, 0.03 mm, 0.046 mm, and 0.09 mm, angle: 30.5 degrees with respect to the light guide direction) were provided in the region of the light guide portion facing the emission portion to be arranged in this order from the light incident surface side of the light guide portion along the light advancing direction in the light guide portion 18 such that the distance between the rectangular centers of gravity was 5 mm, and the uneven patterns having a triangular groove shape formed on the back surface of the emission portion were arranged parallel to the light advancing direction in the light guide portion 18.

Comparative Example 1

A light guide film was prepared having a configuration in which the light guide portion of the second optical unit was wired below the emission portion of the first optical unit and the resin portion was not provided.

In Comparative Example 1, the second optical unit had the same dimensions as those of the second optical unit according to Example 1, except that the emission portion had a thickness of 1 mm, the light guide portion had a width $t_2$ of 10 mm and a height $h_2$ of 1 mm, the light incident surface had a width $t_1$ of 10 mm and a height $h_1$ of 1 mm, and the light guide portion was connected to the center portion of the surface (back surface) of the emission portion opposite to the light emission surface. In addition, the first optical unit had the same dimensions as those of the first optical unit according to Example 1, except that the emission portion had a thickness of 1 mm, the light guide portion had a width $t_2$ of 10 mm and a height $h_2$ of 1 mm, the light incident surface had a width $t_1$ of 10 mm and a height $h_1$ of 1 mm, and the light guide portion was connected to one end surface side of the surface (back surface) of the emission portion opposite to the light emission surface.

The emission portion of the first optical unit and the light guide portion of the second optical unit were arranged to overlap each other in the thickness direction, and the emission portions were aligned in the plane direction.

Example 9

<Preparation of Light Guide Film>

In Example 9, a light guide film in which optical units (emission portions) were arranged in a 16×32 pattern as illustrated in FIG. 22 was prepared. As the first substrate film 20A and the second substrate film 20B, the acrylic resin film (lactonized polymethyl methacrylate film) having a thickness of 40 μm used in Example 3 was used, and the resin portion forming step of the underlayer was not performed. That is, as illustrated in FIG. 23, the light guide film had a structure in which the optical units 12A were directly formed on the first substrate film 20A, the optical units 12B were directly formed on the second substrate film 20B, and these substrate films were laminated.

In addition, in the prepared light guide film, as illustrated in FIG. 22, among the optical units arranged in a 16×32 pattern, 8×24 optical units 12A in the center portion were formed on the first substrate film 20A, and the other optical units 12B on the end portion side were formed on the second substrate film 20B.

As illustrated in 22, the length of the light guide portions 18A of the 8×24 optical units 12A in which the emission portion was arranged in the center portion was longer than the length of the light guide portions 18B of the optical units 12B on the end portion side.

(Preparation of Resin Portion-Forming Coating Solution)

As the resin portion-forming coating solution, the coating solution 1 used in Example 1 was used.

(Preparation of Optical Unit-Forming Coating Solution)

As the optical unit-forming coating solution, the coating solution 2 used in Example 1 was used.

(Optical Unit Forming Step)

As in Example 1, the optical units 12A were formed on the first substrate film 20A using a photoimprint method, and the optical units 12B were formed on the second substrate film 20B.

First, a SUS mold A on which an unevenness shape corresponding to the arrangement pattern of the optical units 12A was formed using a photoetching method was prepared. Likewise, a SUS mold B on which an unevenness shape corresponding to the arrangement pattern of the optical units 12B was formed using a photoetching method was prepared.

The unevenness shape was formed on the SUS mold B such that the shape of the optical units 12B was the following shape. As described above, in FIGS. 24 to 29, a left-right direction (horizontal direction) in FIG. 24 is indicated by arrow X, and an up-down direction (vertical direction) is indicated by arrow Y.

In FIG. 25, in the optical unit 12Ba, the emission portion 16B had a rectangular shape having horizontal and vertical lengths (X direction×Y direction) of 39.875 mm×44.125 mm and a thickness of 0.125 mm, and the light guide portion 18B had a width $t_2$ of 0.125 mm, a height $h_2$ of 0.125 mm, and a length of 0.5 mm. In the optical unit 12Bb, the emission portion 16B had a rectangular shape having a size of 39.875 mm×44.25 mm and a thickness of 0.125 mm, and the light guide portion 18B had a width $t_2$ of 0.125 mm, a height $h_2$ of 0.125 mm, and a length of 80 mm+5.5 mm+0.5 mm. In the optical unit 12Bc, the emission portion 16B had a rectangular shape having a size of 39.875 mm×44.5 mm and a thickness of 0.125 mm, and the light guide portion 18B had a width $t_2$ of 0.125 mm, a height $h_2$ of 0.125 mm, and a length of 120 mm+5.5 mm+0.5 mm. In the optical unit 12Bd, the emission portion 16B had a rectangular shape having a size of 39.875 mm×44.75 mm and a thickness of 0.125 mm, and the light guide portion 18B had a width $t_2$ of 0.125 mm, a height $h_2$ of 0.125 mm, and a length of 160.5 mm.

In addition, all the distances between the optical units 12B were 0.125 mm.

In addition, a plurality of conical uneven patterns were provided on a surface (back surface) of the emission portion 16B of the optical unit 12B opposite to the light emission surface. The uneven patterns were concentrically arranged around an apex of the emission portion 16B closest to the light incident surface of the light guide portion 18B. As a result, the optical unit illustrated in FIG. 25 was formed.

Next, as illustrated in FIG. 26, the rectangular optical units were formed such that the vertical and horizontal lengths (Y direction×X direction) of the emission portions 16B included in the optical unit 12Be, the optical unit 12Bf, the optical unit 12Bg, the optical unit 12Bh were 44.875× 39.125 mm, 44.875×39.25 mm, 44.875×39.5 mm, and 44.875×39.75 mm, respectively. All the thicknesses were 0.125 mm, and all the distances between the optical units 12B were 0.125 mm. Further, the light guide portions 18A of the optical units 12Be to 12Bh were formed based on the lengths of FIG. 25 according to the positions and shapes of the emission portions 16B.

The coating solution 2 was cast between the SUS mold B and the second substrate film 20B using a dispenser, the SUS mold was pressed into contact with the coating solution 2 using a rubber roller at a pressure of 0.3 MPa to discharge an excess amount of the coating solution, and the mold filled with the coating solution 2 was bonded to the second substrate film 20B. Next, the coating solution 2 was irradiated with ultraviolet light at 360 mJ/cm$^2$ from the second substrate film side 20B using a 200 W/cm air-cooled metal halide lamp (manufactured by Eye Graphics Co., Ltd.) to be cured at a room temperature of 25° C. Next, the mold was released, and a plurality of optical units 12B were formed on the second substrate film 20B.

The optical units 12A were formed on the SUS mold A using the same method as that of the optical units 12B. As a result, the optical units 12A illustrated in FIGS. 28 and 29 were obtained.

That is, the emission portions 16A of the optical units 12Aa to 12Ah had the same shapes as the emission portions 16B of the optical units 12Ba to 12Bh, respectively. Further, the light guide portions 18A of the optical units 12 were formed based on the lengths of FIG. 25 according to the positions and shapes of the emission portions 16A.

The coating solution 2 was cast between the SUS mold A and the first substrate film 20A using a dispenser, the SUS mold was pressed into contact with the coating solution 2 using a rubber roller at a pressure of 0.3 MPa to discharge an excess amount of the coating solution, and the mold filled with the coating solution 2 was bonded to the first substrate film 20A. Next, the coating solution 2 was irradiated with ultraviolet light at 360 mJ/cm$^2$ from the first substrate film side 20A using a 200 W/cm air-cooled metal halide lamp (manufactured by Eye Graphics Co., Ltd.) to be cured at a room temperature of 25° C. Next, the mold was released, and a plurality of optical units 12A were formed on the first substrate film 20A.

(Resin Portion Forming Step and Substrate Bonding Step)

The coating solution 1 was cast between the optical unit 12A side of the first substrate film 20A on which the optical units 12A prepared in the above-described steps were formed in the above-described step and the optical unit 12B side of the second substrate film 20B on which the optical units 12B were formed using a dispenser, the SUS mold was pressed into contact with the coating solution 1 using a rubber roller at a pressure of 0.3 MPa to discharge an excess amount of the coating solution, and the coating solution 1 was filled between the first substrate film 20A on which the optical units were formed and the second substrate film 20B. Next, the coating solution 1 was irradiated with ultraviolet light at 2000 mJ/cm$^2$ from the second substrate film 20B side using a 200 W/cm air-cooled metal halide lamp (manufactured by Eye Graphics Co., Ltd.) to be cured at a room temperature of 25° C. As a result, a light guide film was prepared.

Example 10

<Preparation of Light Guide Film>

Figure 30:
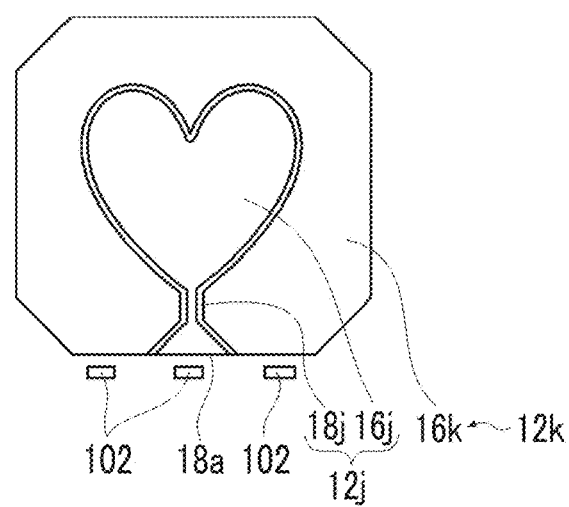
FIG. 30 is a plan view schematically illustrating still another example of the light guide film according to the present invention.

In Example 10, a light guide film was prepared using the same method as that of Example 1, except that, as illustrated in FIG. 30, it includes an optical unit 12j in which the shape of an emission portion 16j was a heart shape having an outer size of 30 mm and an optical unit 12k including an emission portion 16k that was cut out corresponding to the heart shape.

The optical unit 12j included the emission portion 16j having the heart shape and a linear light guide portion 18j, and the light guide portion 18j had a shape that was joined to an acute protrusion of the heart shape. In addition, the light guide portion 18j extended in the up-down direction of the drawing such that an end surface (light incident surface) protruded from the side surface of the light guide film.

In the optical unit 12j, the emission portion 16j had a heart shape having an outer size of 30 mm×30 mm and a thickness of 0.125 mm, the light guide portion 18j had a width $t_2$ of 0.125 mm, a height $h_2$ of 0.125 mm, and a length of 5 mm, and the light incident surface had a width $t_1$ of 7 mm, a height $h_1$ of 0.3 mm, and a depth $s_1$ of 5 mm.

In addition, the emission portion 16k had a shape in which an outer shape was a rectangular shape having a size of 50 mm×50 mm, a corner portion had a shape C-chamfered with a radius of 8 mm, and the center portion was trimmed 0.125 mm from the periphery of the emission portion 16j of the heart shape. Light was incident directly into the emission portion 16k from the side surface.

In addition, a plurality of conical uneven patterns were provided on surfaces (back surfaces) of the emission portion 16j and the emission portion 16k opposite to the light emission surfaces. The uneven patterns were concentrically arranged around an apex of the emission portion 16j closest to the light incident surface of the light guide portion 18j.

Comparative Example 2

Figure 31:
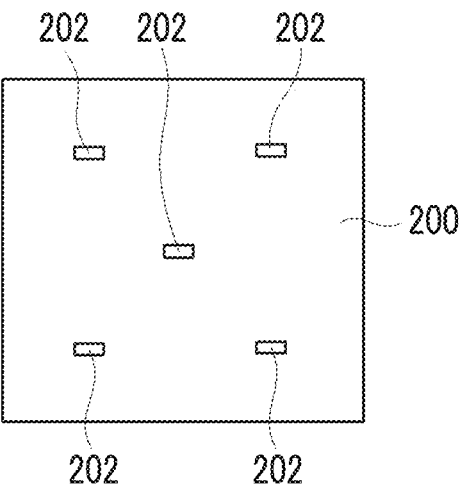
FIG. 31 is a plan view illustrating a comparative example.

LED light sources were arranged on a vinyl chloride sheet and a reflection film ESR (manufactured by 3M) as illustrated in FIG. 31. A sheet formed of MC-PET (manufactured by Furukawa Electric Co., Ltd.) in which a plurality of holes having a diameter of 0.5 mm were formed to correspond to the positions of the LED light sources was arranged on the LED light sources. As a result, a simulation sample of a direct backlight unit was prepared.

Example 11

<Preparation of Light Guide Film>

Figure 32:
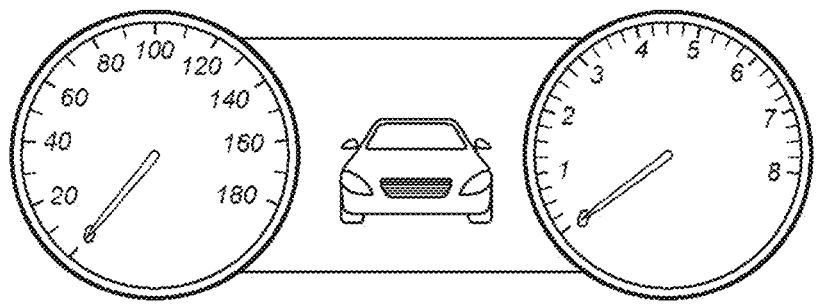
FIG. 32 is a plan view illustrating an example of an on-vehicle meter.
Figure 33:
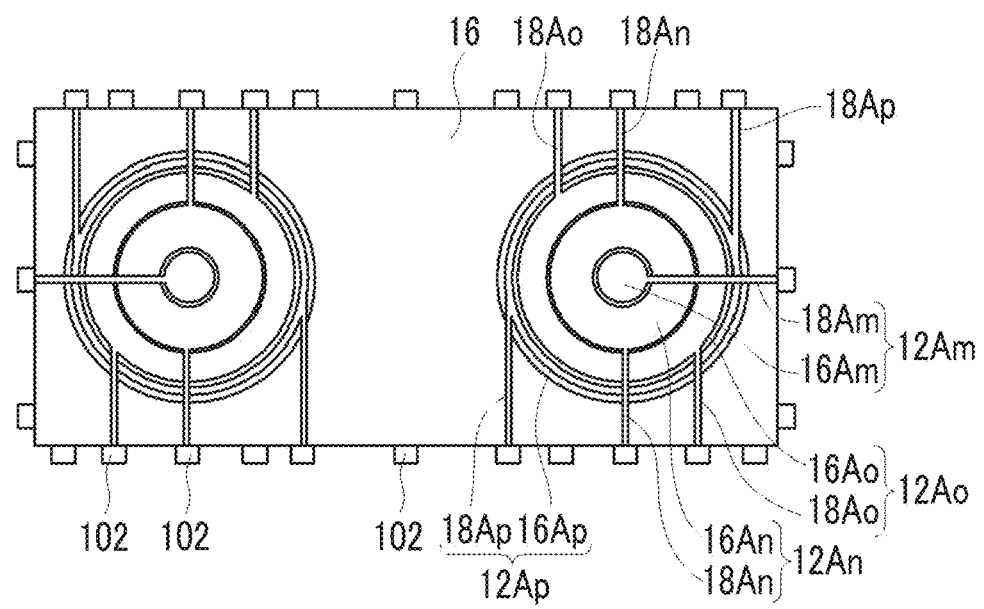
FIG. 33 is a plan view illustrating the arrangement of the optical units.
Figure 34:
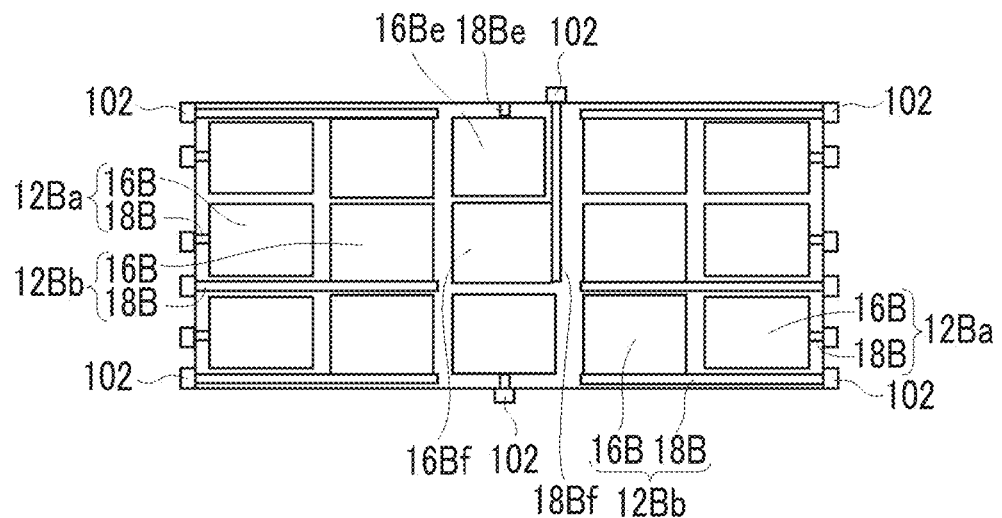
FIG. 34 is a plan view illustrating the arrangement of the optical units.

In Example 11, a light guide film was prepared, in which a first substrate film 20A on which optical units including emission portions with a shape illustrated in FIG. 33 were arranged and a second substrate film 20B on which optical units including 3×5 rectangular emission portions as illustrated in FIG. 34 were arranged were laminated according to a shape of an on-vehicle meter illustrated in FIG. 32.

As the first substrate film 20A and the second substrate film 20B, the acrylic resin film (lactonized polymethyl methacrylate film) having a thickness of 40 μm used in Example 3 was used, and the resin portion forming step of the underlayer was not performed.

In addition, as the resin portion-forming coating solution, the coating solution 1 used in Example 1 was used.

In addition, as the optical unit-forming coating solution, the coating solution 2 used in Example 1 was used.

(Optical Unit Forming Step)

As in Example 1, the optical units 12A were formed on the first substrate film 20A using a photoimprint method, and the optical units 12B were formed on the second substrate film 20B.

First, a SUS mold C on which an unevenness shape corresponding to the arrangement pattern of the optical units 12A was formed using a photoetching method was prepared. Likewise, a SUS mold D on which an unevenness shape corresponding to the arrangement pattern of the optical units 12B was formed using a photoetching method was prepared.

The unevenness shape was formed on the SUS mold D such that the shape of the optical units 12B was the following shape.

Each of 15 optical units 12B included a rectangular emission portion 16B and a linear light guide portion 18B and had a shape in which a part of one side surface of the light guide portion 18B was joined to one side surface of the emission portion to face each other. As illustrated in FIG. 34, 15 emission portions were arranged in a 3×5 pattern. In addition, each of the 15 light guide portions 18B extended in the up-down direction or the left-right direction of the drawing such that an end surface (light incident surface) protruded from the side surface of the light guide film.

In the optical unit 12Ba, the emission portion 16B had a rectangular shape having a size of 52.65 mm×49.25 mm and a thickness of 0.125 mm, and the light guide portion 18B had a width $t_2$ of 0.125 mm, a height $h_2$ of 0.125 mm, and a length of 0.5 mm. In addition, in the optical unit 12Bb, the emission portion 16B had a rectangular shape having a size of 52.65 mm×49.375 mm and a thickness of 0.125 μm, and the light guide portion 18B had a width $t_2$ of 0.125 mm, a height $h_2$ of 0.125 mm, and a length of 105.925 mm.

In the optical unit 12Be, the emission portion 16B had a rectangular shape having a size of 52.65 mm×49.25 mm and a thickness of 0.125 mm, and the light guide portion 18B had a width $t_2$ of 0.125 mm, a height $h_2$ of 0.125 mm, and a length of 0.375 mm. In addition, in the optical unit 12Bf, the emission portion 16B had a rectangular shape having a size of 52.775 mm×49.25 mm and a thickness of 0.125 mm, and the light guide portion 18B had a width $t_2$ of 0.125 mm, a height $h_2$ of 0.125 mm, and a length of 99 mm.

In addition, the distances between the respective optical units 12B were 0.125 mm.

In addition, a plurality of conical uneven patterns were provided on a surface (back surface) of the emission portion 16B of each of the optical units 12B opposite to the light emission surface. The uneven patterns were concentrically arranged around an apex of the emission portion 16B closest to the light incident surface of the light guide portion 18B.

The coating solution 2 was cast between the SUS mold C and the second substrate film 20B using a dispenser, the SUS mold was pressed into contact with the coating solution 2 using a rubber roller at a pressure of 0.3 MPa to discharge an excess amount of the coating solution, and the mold filled with the coating solution 2 was bonded to the second substrate film 20B. Next, the coating solution 2 was irradiated with ultraviolet light at 360 mJ/cm$^2$ from the second substrate film side 20B using a 200 W/cm air-cooled metal halide lamp (manufactured by Eye Graphics Co., Ltd.) to be cured at a room temperature of 25° C. Next, the mold was released, and a plurality of optical units 12B were formed on the second substrate film 20B.

The unevenness shape was formed on the SUS mold C such that the shape of the optical units 12A was the following shape.

As illustrated in FIG. 33, four circular or annular emission portions 16Am to 16Ap (collectively referred to as "16A") were concentrically arranged in two sets. In addition, the light guide portions 18A were connected to the eight emission portions 16A, respectively, and each of the light guide portions 18A extended in the left-right direction or the up-down direction of the drawing such that an end surface (light incident surface) protruded from the side surface of the light guide film.

In addition, the rectangular emission portion 16 having a size of 265 mm×149 mm was provided around the concentric optical unit 12A.

In the optical unit 12Am, an emission portion 16Am was circular and had a diameter of 9 mm and a thickness of 0.125 mm, and a light guide portion 18Am had a width $t_2$ of 0.125 mm and a height $h_2$ of 0.125 mm. In the optical unit 12An, an emission portion 16An was substantially annular and had an outer diameter of 53 mm, an inner diameter of 9.25 mm, and a thickness of 0.125 mm, and a light guide portion 18An had a width $t_2$ of 0.125 mm and a height $h_2$ of 0.125 mm. In the optical unit 12Ao, an emission portion 16Ao was substantially annular and had an outer diameter of 82 mm, an inner diameter of 53.25 mm, and a thickness of 0.125 mm, and a light guide portion 18Ao had a width $t_2$ of 0.125 mm and a height $h_2$ of 0.125 mm. In the optical unit 12Ap, an emission portion 16Ap was substantially annular and had an outer diameter of 90 mm, an inner diameter of 82.25 mm, and a thickness of 0.125 mm, and a light guide portion 18Ap had a width $t_2$ of 0.125 mm and a height $h_2$ of 0.125 mm.

The optical unit 12Am included one light guide portion 18Am extending from the side surface of the light guide film up to the emission portion 16Am. The optical unit 12An included two light guide portions 18An extending from the side surface of the light guide film up to the emission portion 16An. The optical unit 12Ao included two light guide portions 18Ao extending from the side surface of the light guide film up to the emission portion 16Ao. The optical unit 12Ap included two light guide portions 18Ap extending from the side surface of the light guide film up to the emission portion 16Ap. In addition, each of the emission portions 16A was cut out in a route portion of another light guide portion 18A such that the light guide portion 18A was appropriately connected to the emission portion 16A.

The coating solution 2 was cast between the SUS mold C and the second substrate film using a dispenser, the SUS mold was pressed into contact with the coating solution 2 using a rubber roller at a pressure of 0.3 MPa to discharge an excess amount of the coating solution, and the mold filled with the coating solution 2 was bonded to the first substrate film 20A. Next, the coating solution 2 was irradiated with ultraviolet light at 360 mJ/cm$^2$ from the first substrate film side 20A using a 200 W/cm air-cooled metal halide lamp (manufactured by Eye Graphics Co., Ltd.) to be cured at a room temperature of 25° C. Next, the mold was released, and a plurality of optical units 12A were formed on the first substrate film 20A.

(Resin Portion Forming Step and Substrate Bonding Step)

The coating solution 1 was cast between the optical unit 12A side of the first substrate film 20A on which the optical units 12A prepared in the above-described steps were formed in the above-described step and the optical unit 12B side of the second substrate film 20B on which the optical units 12B were formed using a dispenser, the SUS mold was pressed into contact with the coating solution 1 using a rubber roller at a pressure of 0.3 MPa to discharge an excess amount of the coating solution, and the coating solution 1 was filled between the first substrate film 20A on which the optical units were formed and the second substrate film 20B. Next, the coating solution 1 was irradiated with ultraviolet light at 2000 mJ/cm$^2$ from the second substrate film 20B side using a 200 W/cm air-cooled metal halide lamp (manufactured by Eye Graphics Co., Ltd.) to be cured at a room temperature of 25° C. As a result, a light guide film was prepared.

Comparative Example 3

Figure 35:
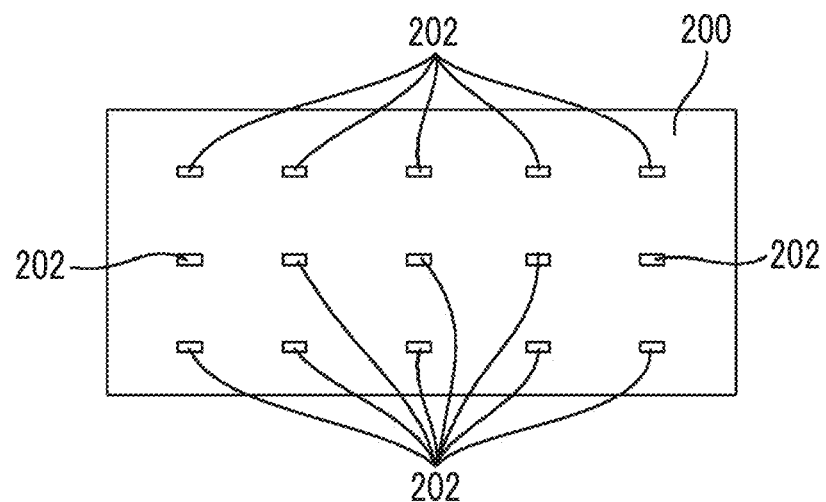
FIG. 35 is a plan view illustrating a comparative example.

LED light sources were arranged on a vinyl chloride sheet and a reflection film ESR (manufactured by 3M) as illustrated in FIG. 35. A sheet formed of MC-PET (manufactured by Furukawa Electric Co., Ltd.) in which a plurality of holes 202 having a diameter of 0.5 mm were formed to correspond to the positions of the LED light sources was arranged on the LED light sources. As a result, a simulation sample of a direct backlight unit was prepared.

<Evaluation Items>

Each of backlight units into which the light guide films prepared in Examples and Comparative Examples was incorporated was prepared, and the brightness unevenness between the optical units, the brightness unevenness in an optical unit plane, and the bending resistance were measured and evaluated as follows.

(Preparation of Backlight Unit)

Regarding each of Examples 1 to 11 and Comparative Example 1, a vinyl chloride sheet, a reflection film ESR (manufactured by 3M), the light guide film, a diffusion sheet, two prism sheets (prism grooves were arranged perpendicular to each other), and DBEF (manufactured by 3M) were arranged in this order, and each of the films and the sheets laminated on the vinyl chloride sheet was fixed. A LED light source was arranged in the light guide portion of the optical unit, and a backlight unit was prepared.

Regarding each of Comparative Examples 2 and 3, a diffusion sheet, two prism sheets (prism grooves were arranged perpendicular to each other), and DBEF (manufactured by 3M) were arranged in this order on MC-PET in which holes of a simulation sample were formed.

(Brightness Unevenness Between Optical Units)

Light was incident from the LED light source into the light guide film, and a brightness distribution 1 in a region of the first optical unit and a brightness distribution 2 in a region of the second optical unit were measured using an imaging colorimeter&photometer PM-1400 (manufactured by Radiant Vision Systems, LLC).

In Example 9, the brightness distribution was measured by using the optical unit 12Aa as the first optical unit and the optical unit 12Ad as the second optical unit. In addition, in Example 10, the brightness distribution was measured by using the optical unit 12$j$ as the first optical unit and the optical unit 12$k$ as the second optical unit. In addition, in Example 11, the brightness distribution was measured by using the optical unit 12Ba as the first optical unit and the optical unit 12Bb as the second optical unit.

Average brightnesses 1 and 2 were obtained from the measured brightness distributions 1 and 2, and a brightness change rate between the units was calculated from the following expression Brightness Change Rate between Units=|Average Brightness 1−Average Brightness 2|/{(Average Brightness 1+Average Brightness 2)×0.5}

By using the brightness change rate between the units as an index, the brightness unevenness between the optical units was evaluated based on the following four grades.

<Evaluation Standards>

A: the brightness change rate was 0% or higher and lower than 20%

B: the brightness change rate was 20% or higher and lower than 40%

C: the brightness change rate was 40% or higher and lower than 60%

D: the brightness change rate was 60% or higher (Brightness Unevenness in Optical Unit Plane)

The average brightnesses 1 and 2, maximum brightnesses 1 and 2, and minimum brightnesses 1 and 2 were obtained from the brightness distributions 1 and 2 measured described above, respectively, and brightness change rates 1 and 2 were measured from the following expression.

Brightness change rate $i$=(Maximum Brightness $i$−Minimum Brightness $i$)/Average Brightness $i$ $i$ represents 1 or 2

By using a higher value among the brightness change rates 1 and 2 as an index, the brightness unevenness in an optical unit plane was evaluated based on the following four grades.

<Evaluation Standards>

A: the brightness change rate was 0% or higher and lower than 20%

B: the brightness change rate was 20% or higher and lower than 40%

C: the brightness change rate was 40% or higher and lower than 60%

D: the brightness change rate was 60% or higher

The evaluation results are shown in Table 1.

(Bending Resistance)

Light was incident into only the light guide portion of the second optical unit of the prepared backlight unit, and an average brightness in a region of the second optical unit was measured using an imaging colorimeter&photometer PM-1400 (manufactured by Radiant Vision Systems, LLC).

Next, in a state where the backlight unit was bent at a curvature radius of 45 mm, light was incident into only the light guide portion of the second optical unit as described above, and the average brightness in the region of the second optical unit was measured A ratio of the average brightness in the bent state to an average brightness in a state where the back light unit was not bent was calculated, and the bending resistance was evaluated based on the following four grades.

<Evaluation Standards>

A: 60% or higher

B: 40% or higher and lower than 60%

C: 20% or higher and lower than 40%

D: 0% or higher and lower than 20%

The evaluation results are shown in Table 2.

(Halo)

The degree of a halo was evaluated as follows. The degree of a halo was calculated from a contrast ratio (L0/Ln) of an average brightness L0 light illuminated by one optical unit alone to an average brightness Ln of light leaked to an adjacent non-lighted optical unit, and was evaluated based on the following four grades.

<Evaluation Standards>

A: 3.5 or higher

B: 2.75 or higher and lower than 3.5

C: 2 or higher and lower than 2.75

D: lower than 2

The evaluation results are shown in Table 3.

Figure 36:
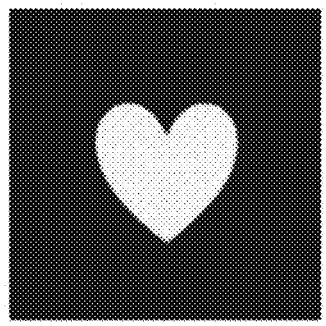
FIG. 36 is an image illustrating a halo in an example
Figure 37:
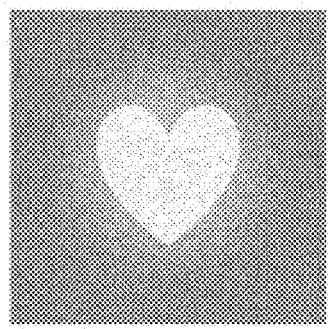
FIG. 37 is an image illustrating a halo in a comparative example.

In addition, FIGS. 36 and 37 illustrate images of states of Example 10 and Comparative Example 2 in which a liquid crystal panel with a drive circuit extracted from a liquid crystal monitor (LL-M220, manufactured by Sharp Corporation) was arranged on the prepared backlight unit and a heart shape having an outer size of 30 mm was displayed by white (a portion other than the heart shape was displayed by black). In the case of Example 10, in the portion other than the heart shape, a halo was not observed without the occurrence of black light leakage. In the case of Comparative Example 2, black light leakage occurred, and a halo occurred.

TABLE 1

| | Substrate Film | | Resin Portion | | Optical Unit |
|---|---|---|---|---|---|
| | Material | Thickness | Material | Thickness of Resin Portion on Optical Unit | Junction between Light Guide Portion and Emission Portion |
| Example 1 | PET | 23 μm | KER-4000-UV | 0.04 mm | Joined |
| Example 2 | None | — | KEF-4000-UV | — | Joined |
| Example 3 | Acryl | 40 μm | KER-4000-UV | 0 mm | Joined |
| Example 4 | PET | 23 μm | KER-4000-UV | 0.04 mm | Joined |
| Example 5 | PET | 23 μm | KER-4000-UV | 0.04 mm | Joined |
| Example 6 | PET | 23 μm | Acrylic Resin 1 | 0.04 mm | Joined |
| Example 7 | PET | 23 μm | KER-4000-UV | 0.04 mm | Distant |
| Example 8 | PET | 23 μm | KER-4000-UV | 0.04 mm | Joined |
| Example 9 | Acryl | 40 μm | KER-4000-UV | 0 mm | Joined |
| Example 10 | PET | 23 μm | KER-4000-UV | 0.04 mm | Joined |
| Example 11 | Acryl | 40 μm | KER-4000-UV | 0 mm | Joined |

| | Optical Unit | | | Evaluation | |
|---|---|---|---|---|---|
| | Light Extraction Structure of Light Guide Portion | Light Extraction Structure of Emission Portion | Reflecting Layer | Brightness Unevenness between Optical Units | Brightness Unevenness in Optical Unit Plane |
| Example 1 | None | Arc-Shaped | None | C | C |
| Example 2 | None | Arc-Shaped | None | C | C |
| Example 3 | None | Arc-Shaped | None | C | C |
| Example 4 | Hole Portions in Junction Portion | Parallel | None | B | B |
| Example 5 | Hole Portions in Junction Portion | Parallel | Present | B | B |
| Example 6 | None | Arc-Shaped | None | C | C |
| Example 7 | Uneven Pattern | Parallel | None | B | B |
| Example 8 | Hole Portions in Light Guide Portion | Parallel | None | A | B |
| Example 9 | None | Arc-Shaped | None | C | C |
| Example 10 | None | Arc-Shaped | None | C | C |
| Example 11 | None | Arc-Shaped | None | C | C |

TABLE 2

| | Resin Portion | | | | Optical Unit | | | | | |
|---|---|---|---|---|---|---|---|---|---|---|
| | Substrate Film | | | Thickness of Resin Portion on Optical Unit | Material | Arrangement Relationship between Light Guide Portion and Emission Portion | Light Extraction Structure of Light Guide Portion | Light Extraction Structure of Emission Portion | Reflecting Layer | Evaluation Bending Resistance |
| | Material | Thickness | Material | | | | | | | |
| Example 1 | PET | 23 μm | KER-4000-UV | 0.04 mm | EA-F5710 | Joined | None | Arc-Shaped | None | B |
| Example 2 | None | — | KER-4000-UV | — | EA-F5710 | Joined | None | Arc-Shaped | None | B |
| Example 3 | Acryl | 40 μm | KER-4000-UV | 0 mm | EA-F5710 | Joined | None | Arc-Shaped | None | B |
| Example 4 | PET | 23 μm | KER-4000-UV | 0.04 mm | EA-F5710 | Joined | Hole Portions in Junction Portion | Parallel | None | B |
| Example 5 | PET | 23 μm | KER-4000-UV | 0.04 mm | EA-F5710 | Joined | Hole Portions in Junction Portion | Parallel | Present | B |
| Example 6 | PET | 23 μm | Acrylic Resin 1 | 0.04 mm | EA-F5710 | Joined | None | Arc-Shaped | None | B |
| Example 7 | PET | 23 μm | KER-4000-UV | 0.04 mm | EA-F5710 | Distant | Uneven Pattern | Parallel | None | B |
| Example 8 | PET | 23 μm | KER-4000-UV | 0.04 mm | EA-F5710 | Joined | Hole Portions in Light Guide Portion | Parallel | None | B |
| Comparative Example 1 | — | — | — | — | Acrylic Resin | Joined | — | — | — | D |
| Example 9 | Acryl | 40 μm | KER-4000-UV | 0 mm | EA-F5710 | Joined | None | Arc-Shaped | None | B |
| Example 10 | PET | 23 μm | KER-4000-UV | 0.04 mm | EA-F5710 | Joined | None | Arc-Shaped | None | B |
| Example 11 | Acryl | 40 μm | KER-4000-UV | 0 mm | EA-F5710 | Joined | None | Arc-Shaped | None | B |

TABLE 3

|  | Light Source Position | Tile Shape | Degree of Halo |
|---|---|---|---|
| Example 9 | Edge | Rectangular | B |
| Example 10 | Edge | Different Shape | B |
| Comparative Example 2 | Direct Backlight | — | D |
| Example 11 | Edge | Different Shape | B |
| Comparative Example 3 | Direct Backlight | — | D |

It can be seen from Table 2 that, in Examples 1 to 11 of the light guide film according to the embodiment of the present invention, the bending resistance was higher than that of Comparative Examples.

In addition, it can be seen from Table 1 that it is preferable that the light guide portion has a light extraction structure in order to guide light the light guide portion into the emission portion.

In addition, it can be seen from Table 3 and a comparison between FIG. 36 and FIG. 37 that in Examples of the present invention, the occurrence of a halo can be further reduced as compared to Comparative Examples.

As can be seen from the above results, the effects of the present invention are obvious.

EXPLANATION OF REFERENCES 10a, 10b, 10c, 10d: light guide film
12, 12b, 12c, 12d, 12e, 12A, 12B: optical unit
14: resin portion
16, 16A, 16B: emission portion
18, 18A, 18B: light guide portion
18a: light incident surface
20, 20A, 20B: substrate film
22, 26: light extraction structure
24: junction portion
32: resin portion-forming coating solution
37: optical unit-forming coating solution
50: transfer roller
52, 58, 62, 68: backup roller
54, 64: coating portion
56, 66: curing portion
59: laminated film
60: laminating roller
100: backlight unit
102: light source

What is claimed is:

1. A light guide film comprising:
a plurality of optical units, each of which includes a light guide portion and an emission portion; and
a resin portion that is filled between the optical units adjacent to each other,
wherein the light guide portion guides light incident from a light source to the emission portion,
the emission portion emits light guided and incident from the light guide portion from a light emission surface,
the plurality of optical units are arranged in a plane direction of the light emission surfaces such that the light emission surfaces of the emission portions are parallel to each other,
the light guide portions and the emission portions are arranged in the plane direction of the light emission surfaces,
the emission portion and the light guide portion of each of the optical units are joined to each other at a plurality of positions in a direction parallel to a light advancing direction in the light guide portion, and
a distance between junction portions adjacent to each other decreases toward the light advancing direction in the light guide portion.

2. The light guide film according to claim 1,
wherein the emission portion has a light extraction structure for emitting light from the light emission surface.

3. The light guide film according to claim 1,
wherein the light guide portion of each of the optical units has a light extraction structure for emitting light toward the emission portion.

4. The light guide film according to claim 1,
wherein a height of the light guide portion in a direction perpendicular to the light emission surface is 2 mm or less, and
a width of the light guide portion in a direction perpendicular to a light advancing direction in the light guide portion is 5 mm or less.

5. The light guide film according to claim 1,
wherein the plurality of optical units are covered with the resin portion.

6. The light guide film according to claim 5,
wherein a thickness of a portion of the resin portion that is laminated on the optical unit is 40 μm or more.

7. The light guide film according to claim 1,
wherein a material forming the resin portion has a lower refractive index than a material forming the optical unit.

8. The light guide film according to claim 1, further comprising:
a substrate film,
wherein the plurality of optical units are arranged on one main surface of the substrate film.

9. A backlight unit comprising:
the light guide film according to claim 1; and
a plurality of light sources that emits light toward each of the plurality of light guide portions of the optical units of the light guide film.

10. The backlight unit according to claim 9,
wherein the light source is a light emitting diode or a semiconductor laser.

* * * * *